United States Patent [19]

Kobayashi et al.

[11] Patent Number: 5,621,714
[45] Date of Patent: Apr. 15, 1997

[54] OPTICAL PICK-UP APPARATUS HAVING HOLOGRAM AND BEAM SPLITTER WITH BIREFRINGENT MEMBER AND POLARIZING FILM

[75] Inventors: Shohei Kobayashi; Takeshi Yamazaki, both of Hachioji; Hiroyuki Imabayashi, Machida, all of Japan

[73] Assignee: Olympus Optical Co., Ltd., Tokyo, Japan

[21] Appl. No.: 400,757

[22] Filed: Mar. 8, 1995

[30] Foreign Application Priority Data

| Feb. 12, 1994 | [JP] | Japan | 6-307418 |
| Mar. 8, 1994 | [JP] | Japan | 6-037068 |
| Mar. 10, 1994 | [JP] | Japan | 6-039649 |
| Mar. 24, 1994 | [JP] | Japan | 6-053823 |

[51] Int. Cl.$^6$ .................................................. G11B 7/00
[52] U.S. Cl. .................. 369/103; 369/44.23; 369/109; 369/110; 369/112; 369/44.12; 369/122
[58] Field of Search .................. 369/44.23, 44.41, 369/44.12, 122, 103, 110, 112, 109

[56] References Cited

U.S. PATENT DOCUMENTS

| 4,551,819 | 11/1985 | Michl et al. | 365/120 |
| 4,885,734 | 12/1989 | Yuzo | 369/112 |
| 5,361,244 | 11/1994 | Nakamura et al. | 369/44.23 |
| 5,426,626 | 6/1995 | Katayama | 369/44.41 |
| 5,446,719 | 8/1995 | Yoshida et al. | 369/44.12 |

FOREIGN PATENT DOCUMENTS

| 63-160018 | 7/1988 | Japan . |
| 63-161541 | 7/1988 | Japan . |
| 64-27055A | 1/1989 | Japan . |
| 1315721 | 12/1989 | Japan . |
| 237536 | 2/1990 | Japan . |
| 3-212828 | 9/1991 | Japan . |
| 5-120755 | 5/1993 | Japan . |

OTHER PUBLICATIONS

Extended Abstracts, The 54th Autumn Meeting, The Japan Society of Applied Physics, 28a-SF-19, Nakanishi, et al, "Development of Laser-Detector-Hologram-Unit (LDHU) for CD Optical Pickup Head"; and 28a-SF-20, Yamazaki, et al, Development of Laser-Detector-Hologram-Unit (LDHU) for CD Optical Pickup Head; pp., 1010–1011, May, 1993.

Kimura et al, "An Optical Head Using Multi-functional Hologram for CD Players", Symposium of Optical Memory '86, pp. 93–98, Dec. 17–19, 1986.

Yoshida et al, "Environmental Stability of CD Pickup Using an HOE", Symposium of Optical Memory '90, pp. 3–4, Jul. 9–11, 1990.

Nagano et al, "Compact Optical Head Integrated with CHip Elements for CD-ROM Drives", Symposium of Optical Memory '92, pp. 113–114, Jul. 13–15, 1992.

*Primary Examiner*—Georgia Y. Epps
*Assistant Examiner*—Kim-kwok Chu
*Attorney, Agent, or Firm*—Watson Cole Stevens Davis, P.L.L.C.

[57] ABSTRACT

An optical pick-up apparatus for reproducing information recorded on a magneto-optical record medium including a semiconductor laser emitting a linearly polarized laser beam, and a polarizing film provided between a glass prism and a uniaxial birefringent crystal prism. The laser beam emitted by the semiconductor laser is made incident upon the polarizing film via the glass prism and is reflected thereby. The apparatus further includes an objective lens projecting the laser beam reflected by the polarizing film onto the magneto-optical record medium as a fine spot and converging a return laser beam reflected by the record medium toward the polarizing film. The return beam transmitted through the polarizing film is refracted by the uniaxial birefringent crystal prism and is divided into ordinary light and extraordinary light, which are received by a first photodetector to produce a reproduced information signal. The return beam reflected by the polarizing film is made incident upon a hologram and is diffracted thereby into ±1-order beams which are received by a second photodetector to produce a focusing error signal and a tracking error signal.

18 Claims, 31 Drawing Sheets

FIG_1
PRIOR ART
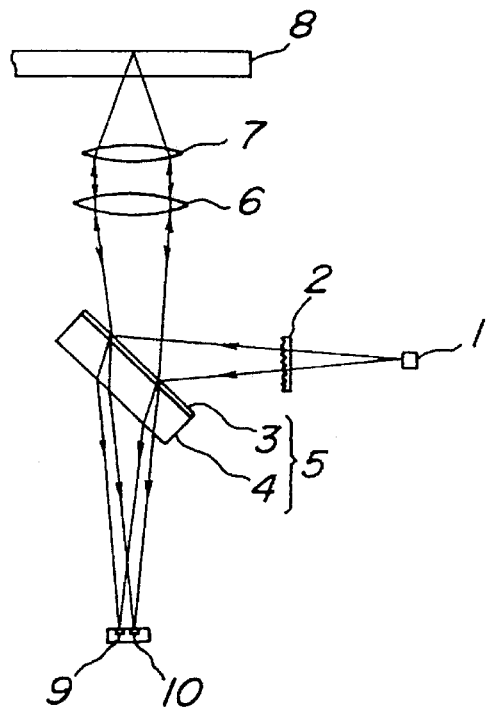
FIG_2
PRIOR ART
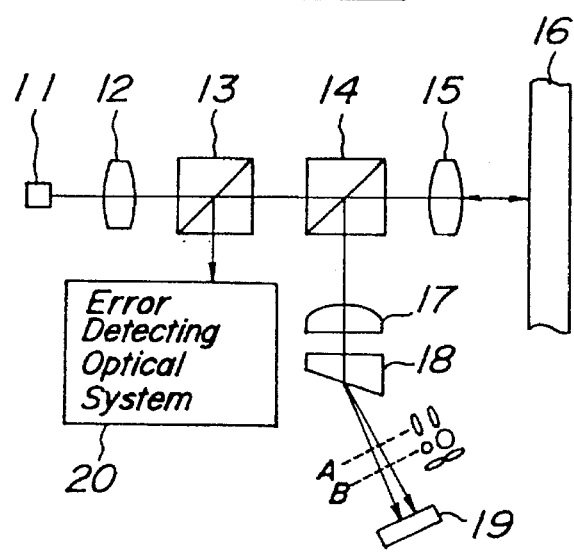

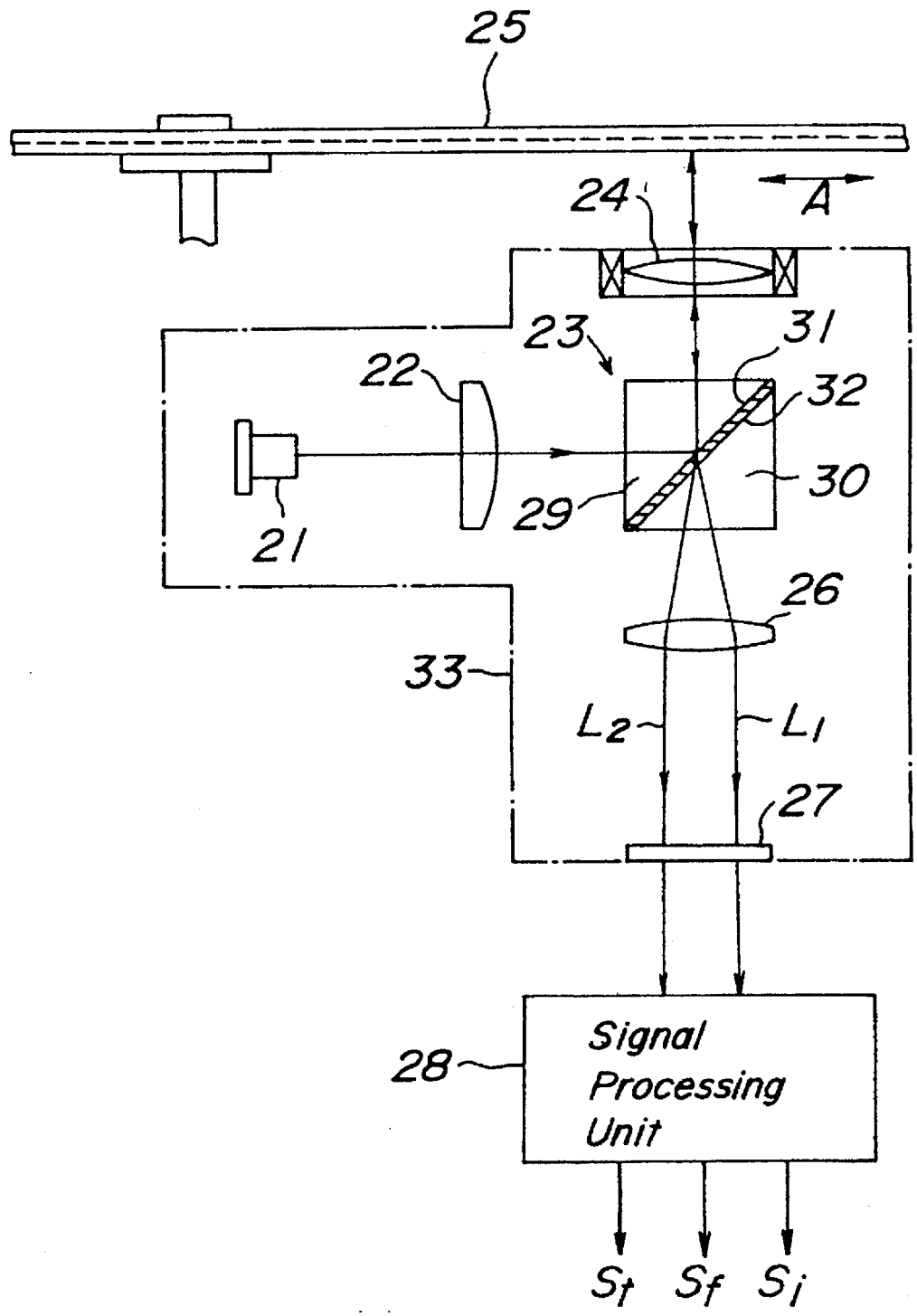

FIG_4
PRIOR ART
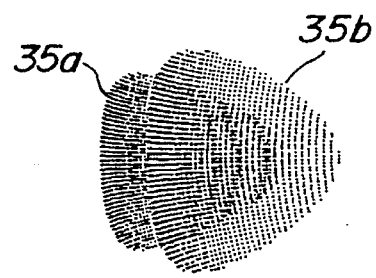
20μm
FIG_5A
PRIOR ART
500μm
FIG_5B
PRIOR ART
500μm

FIG_6
PRIOR ART
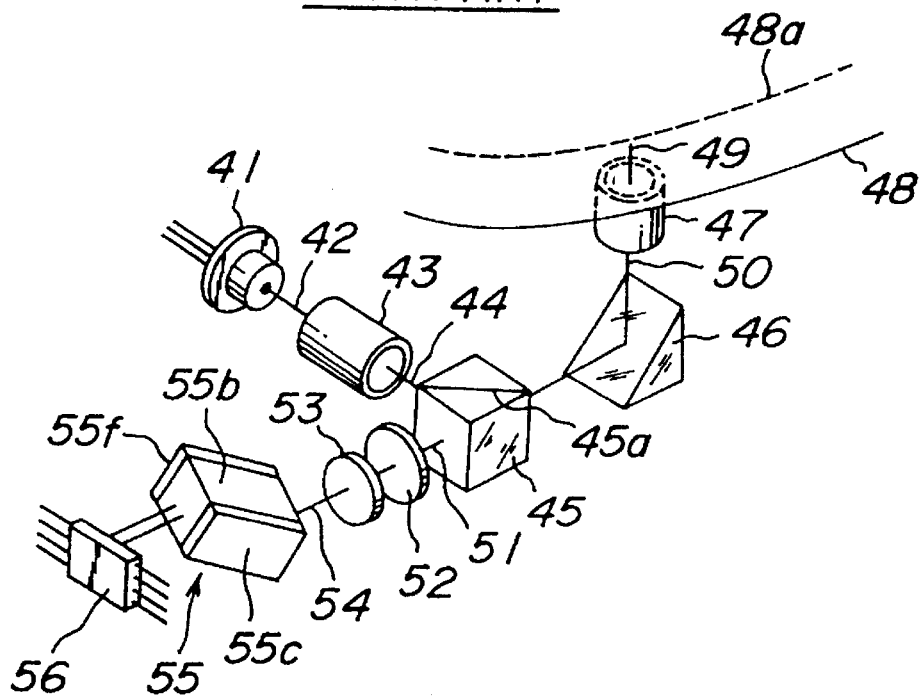
FIG_7
PRIOR ART
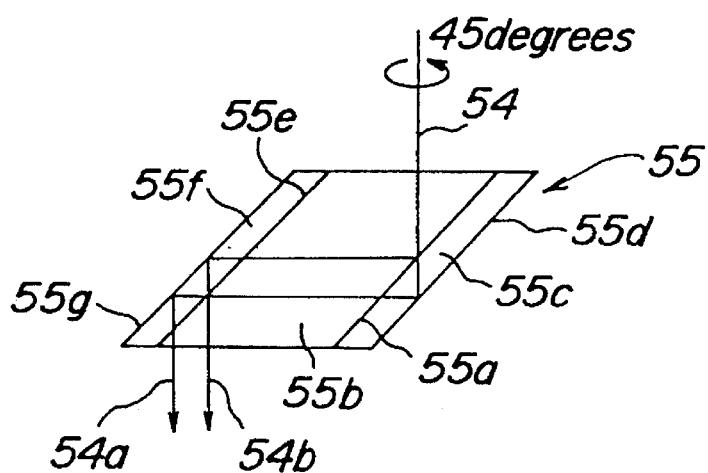

FIG_8 PRIOR ART
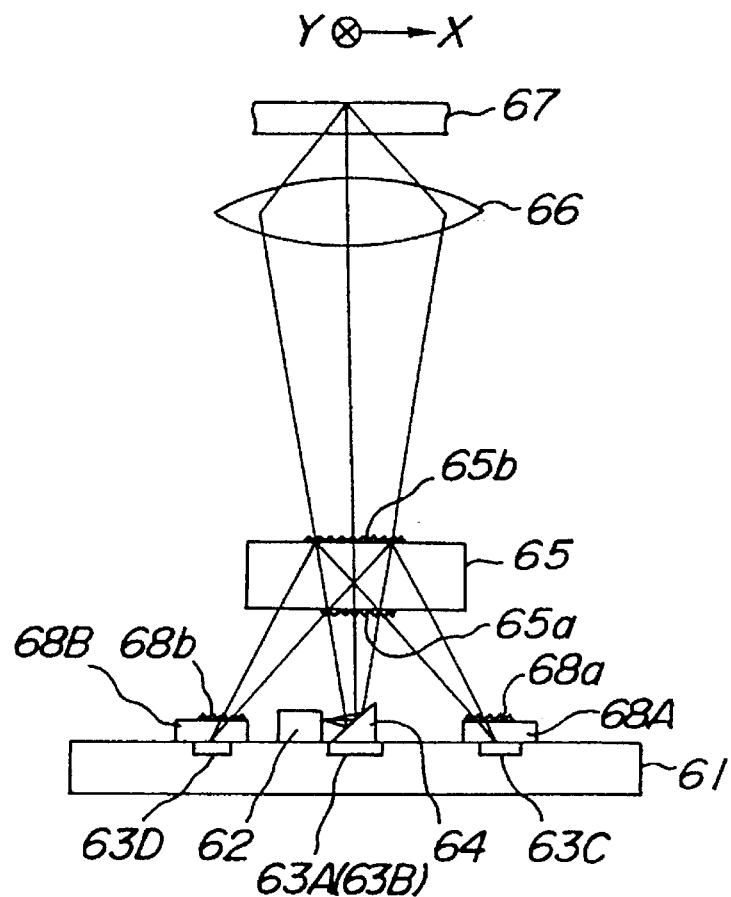
FIG_9 PRIOR ART
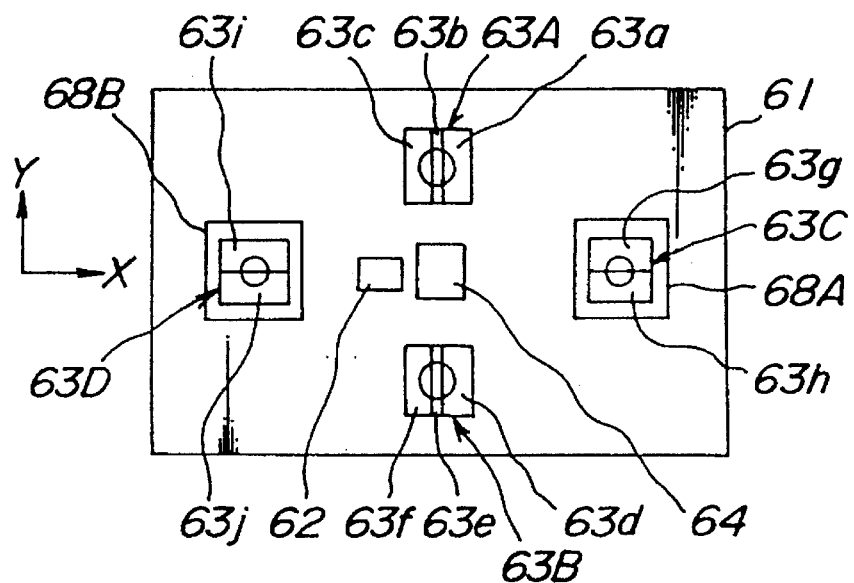

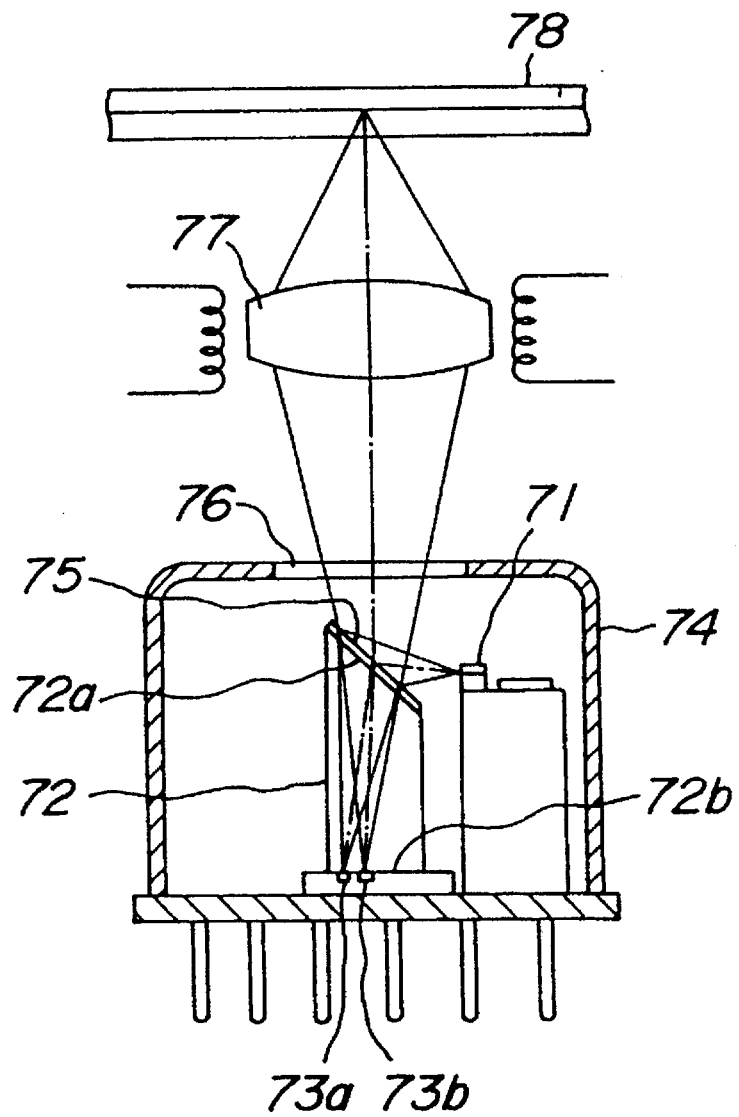
FIG_10
PRIOR ART

20 μm

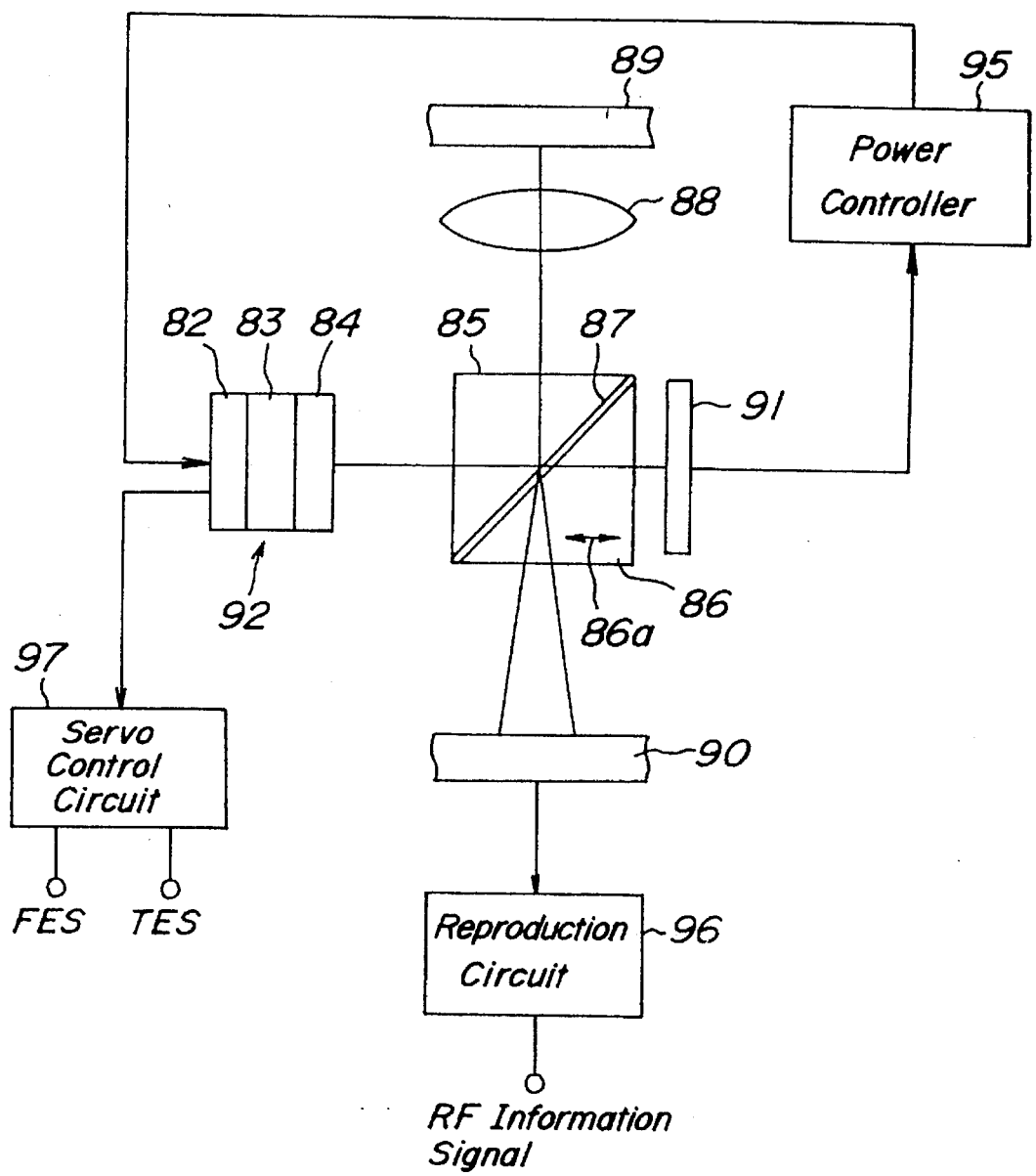
FIG_13

FIG._14
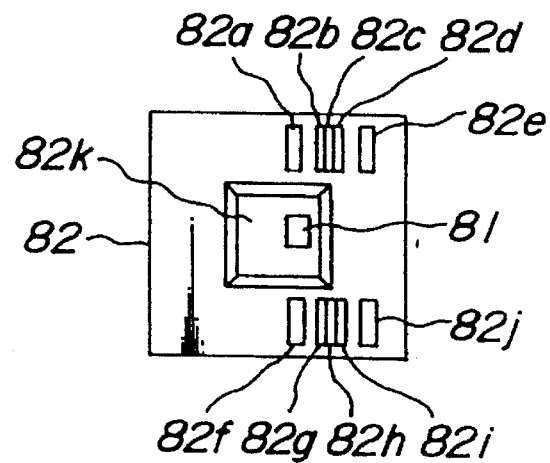
FIG._15
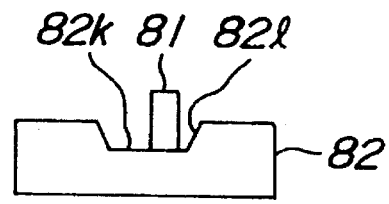
FIG._16
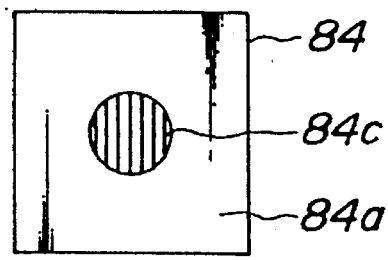

FIG_17
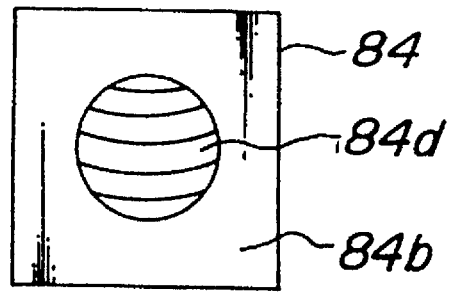
FIG_18
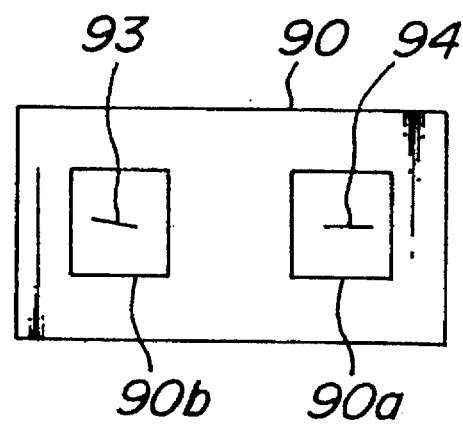
20μm

FIG_19
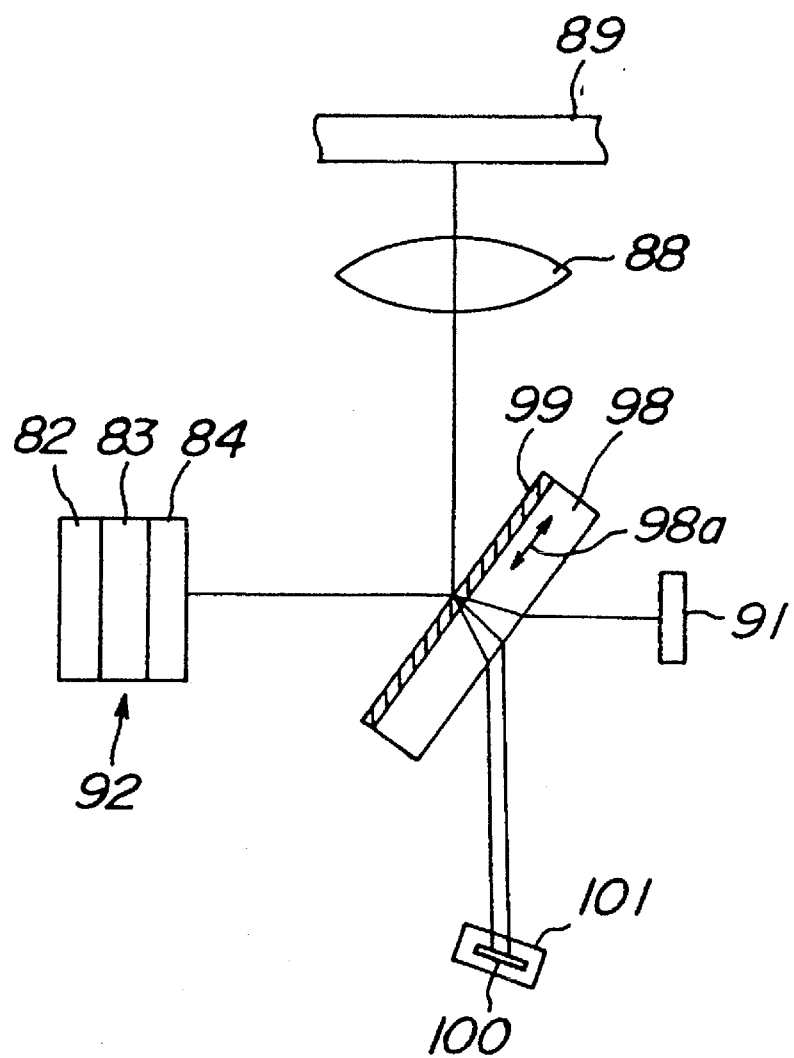

FIG_21
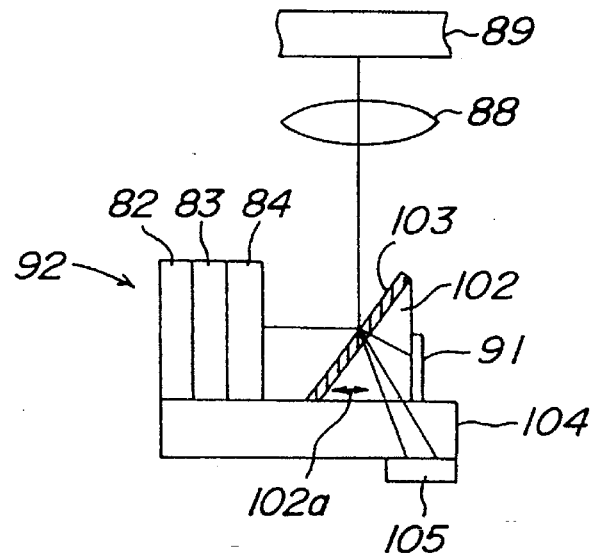
FIG_22
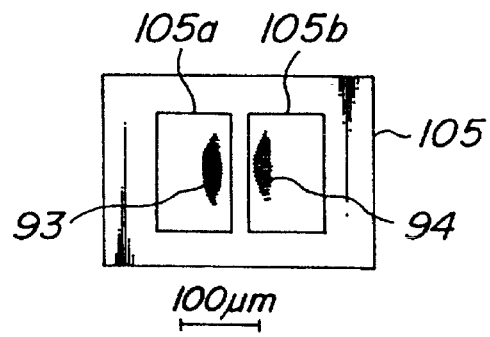
FIG_23
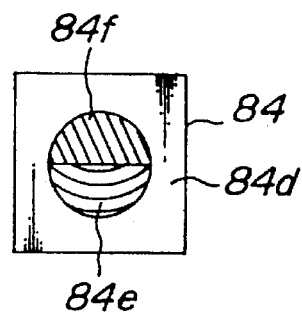

FIG._25
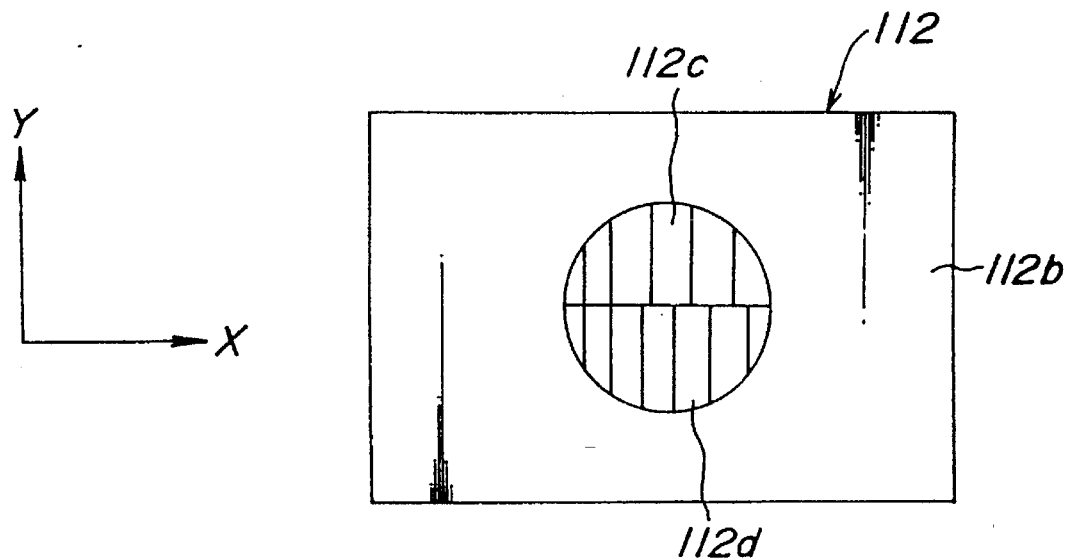
FIG._26
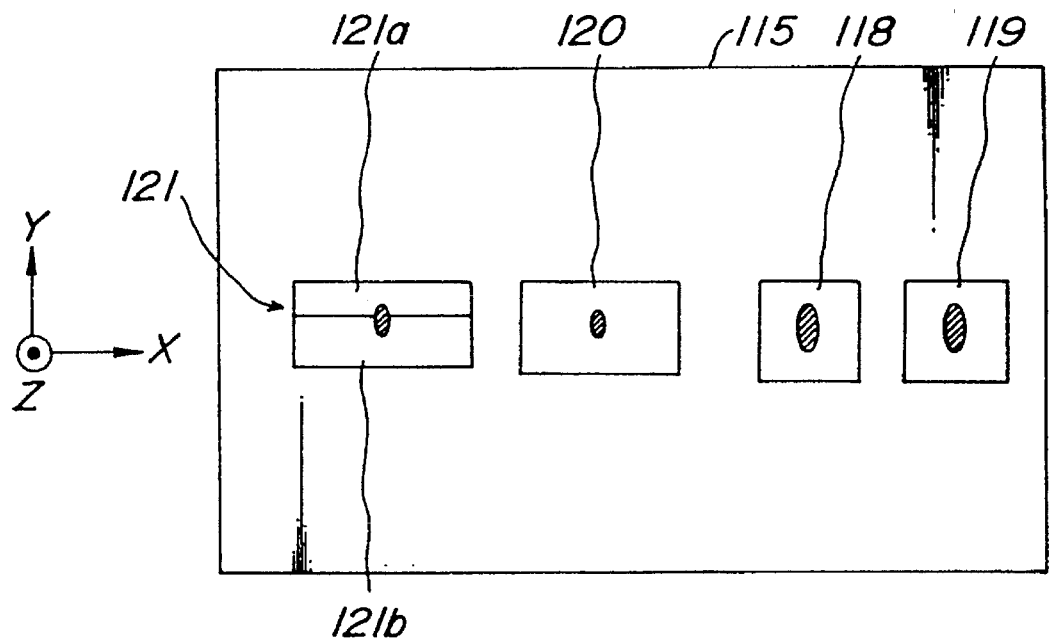

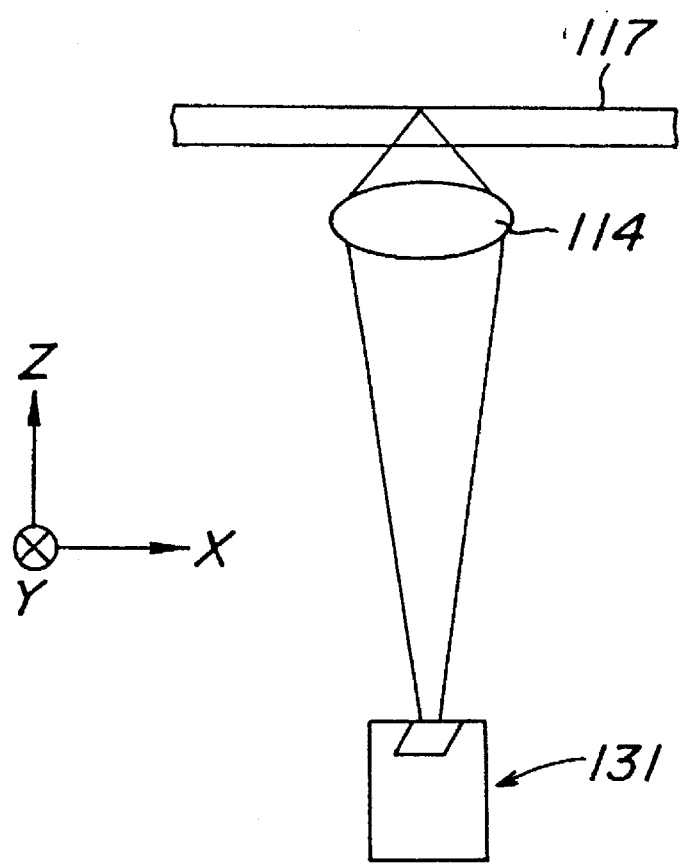
FIG_29

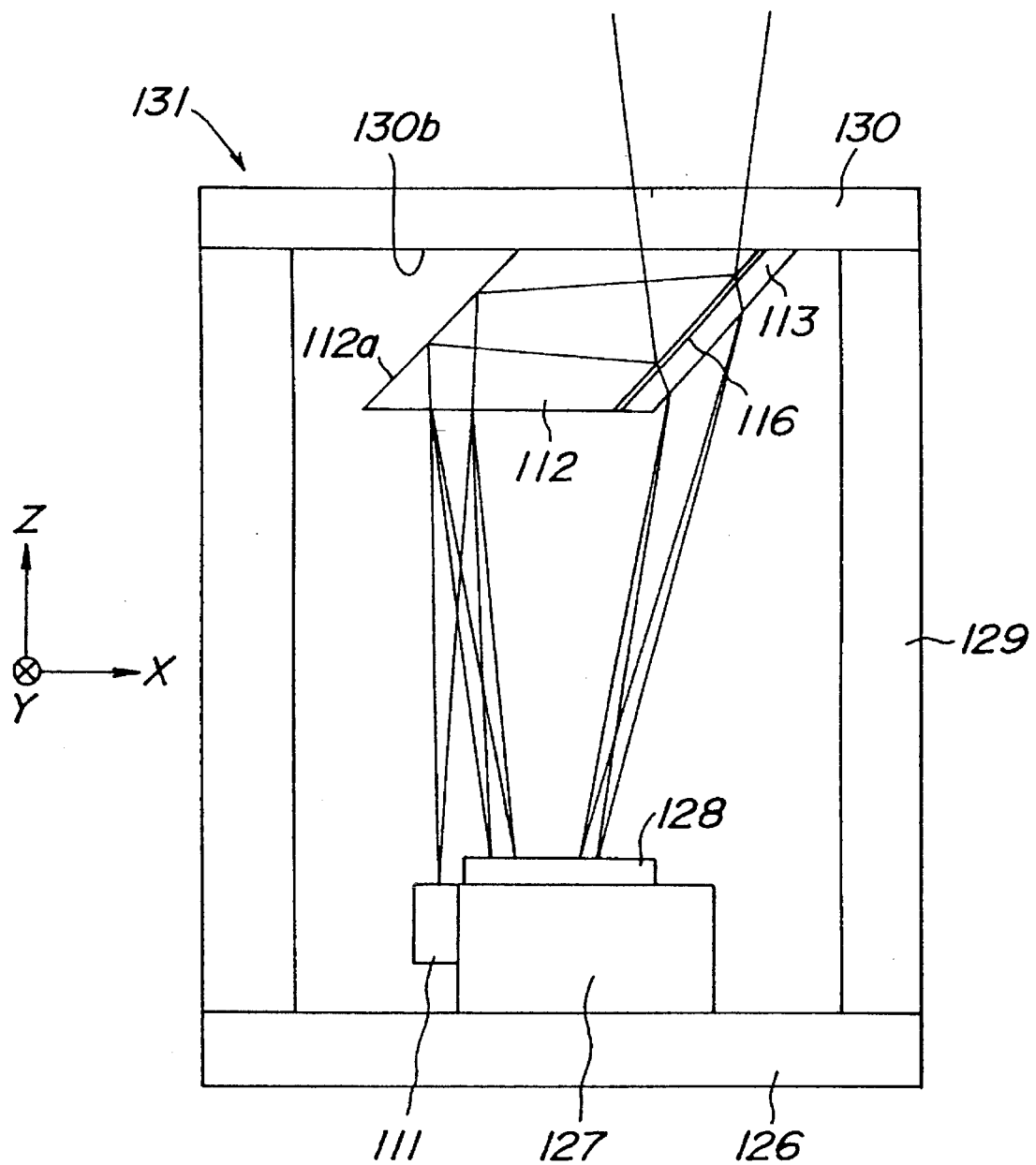
FIG_30

FIG_31
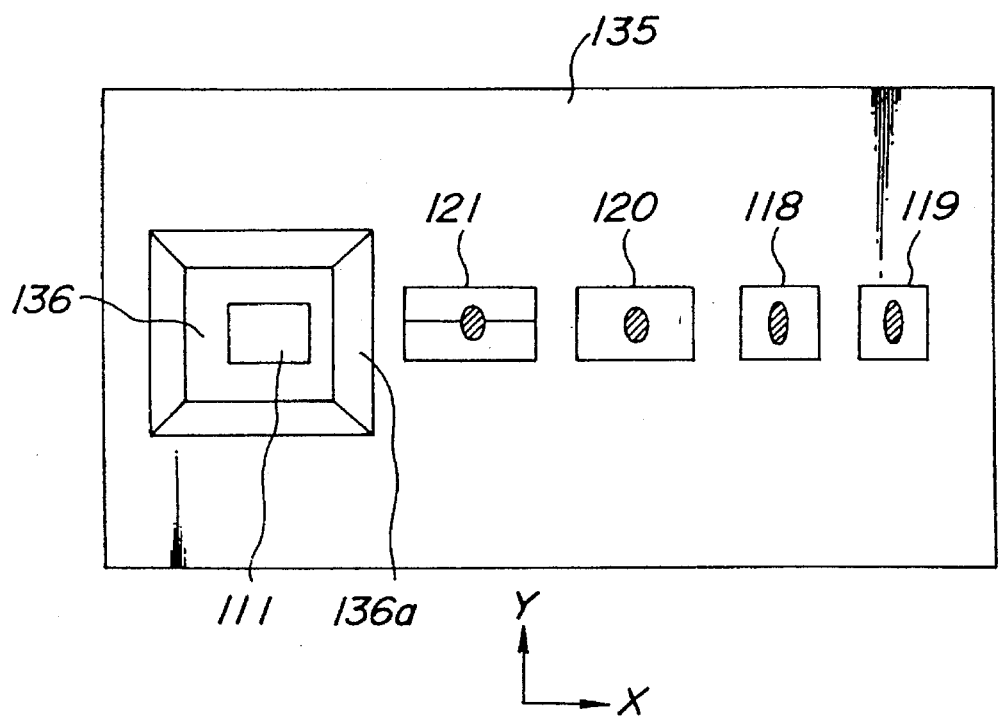
FIG_32
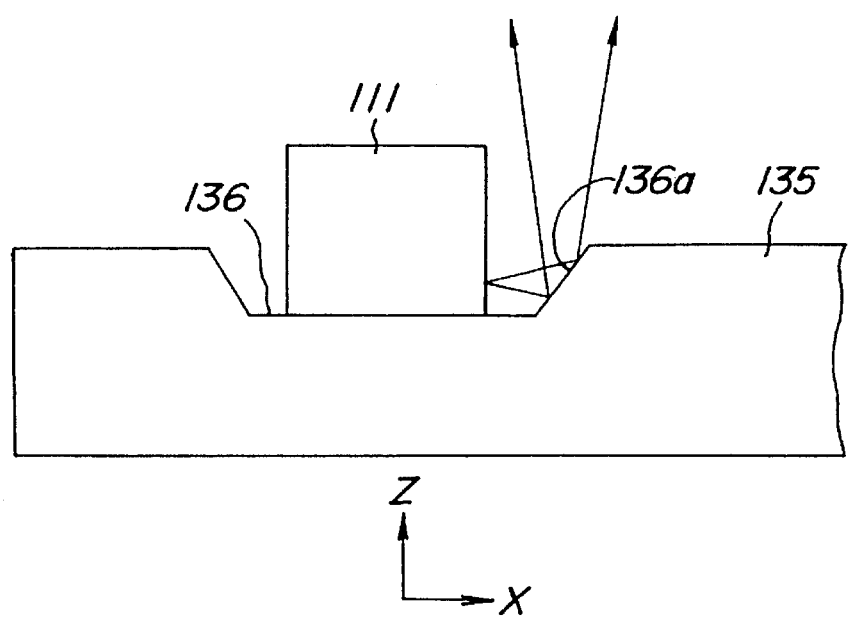

FIG_36

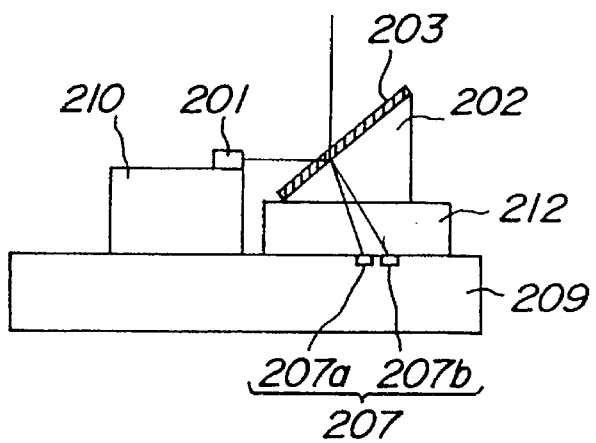
FIG_40
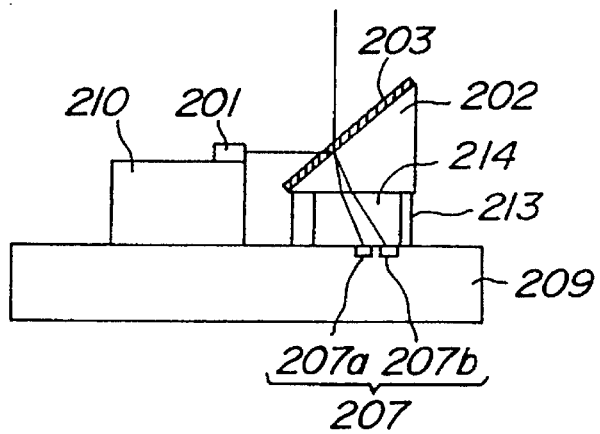
FIG_41
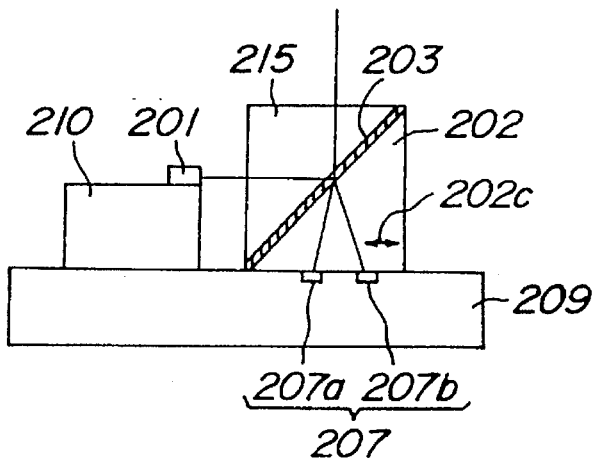
FIG_42

FIG_43
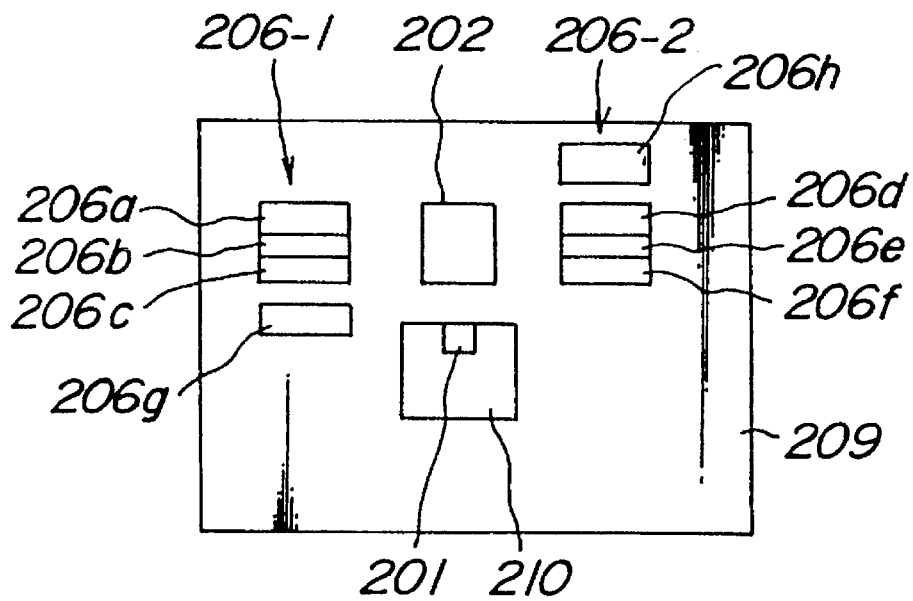
FIG_44
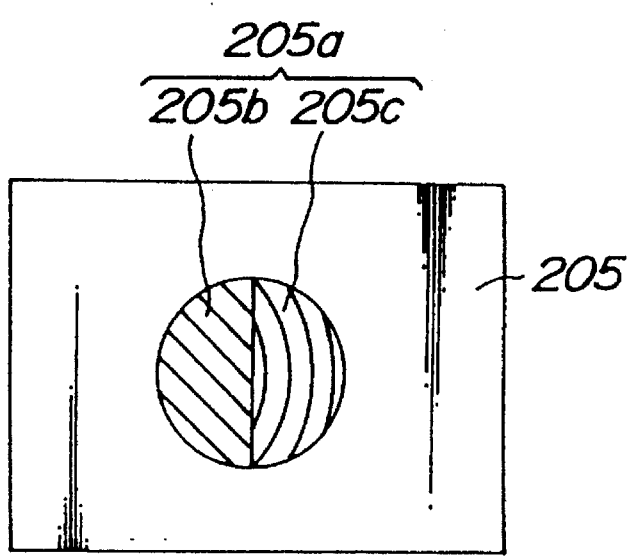

FIG_48
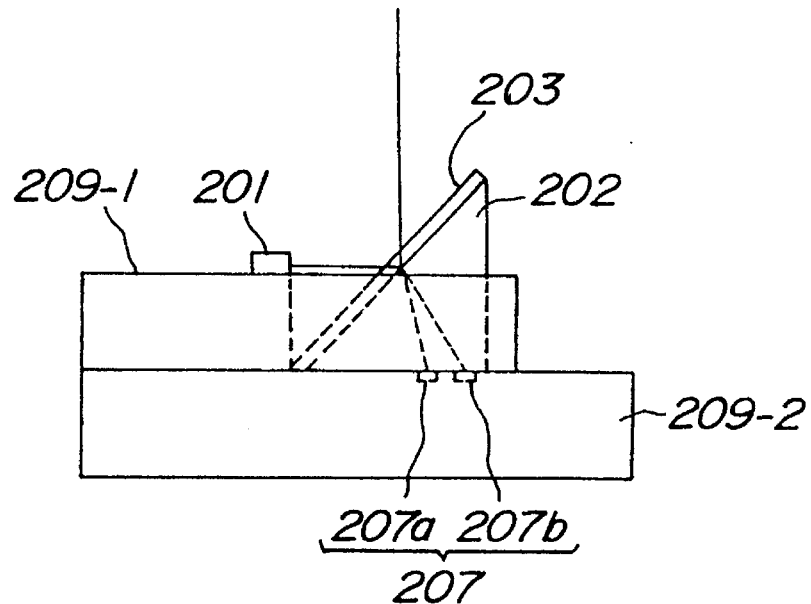
FIG_49
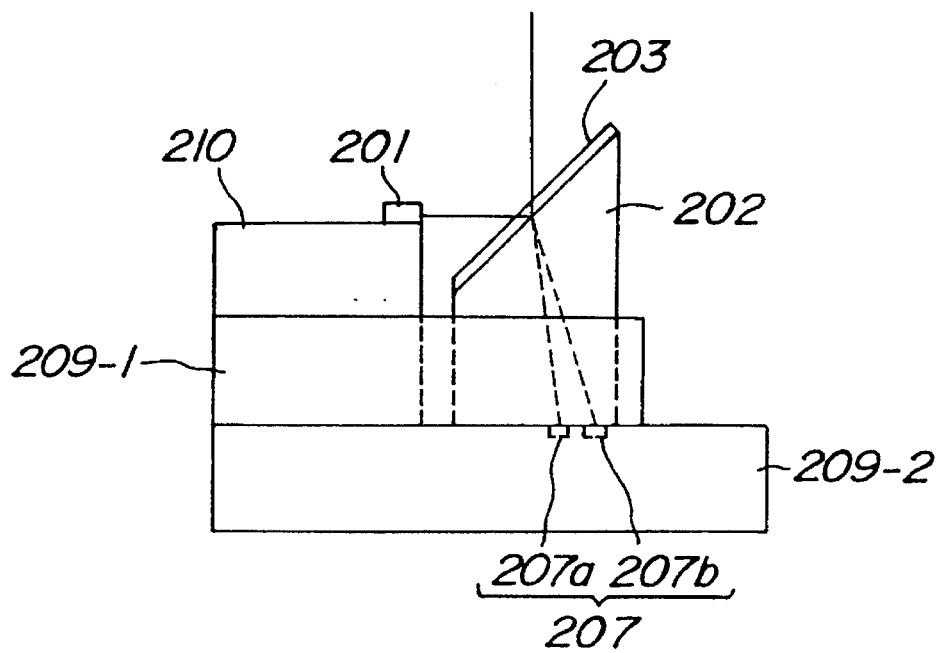

OPTICAL PICK-UP APPARATUS HAVING HOLOGRAM AND BEAM SPLITTER WITH BIREFRINGENT MEMBER AND POLARIZING FILM

BACKGROUND OF THE INVENTION

1. Field of the Invention

The present invention relates to an optical pick-up apparatus for picking-up information out of an optical record medium by projecting a light beam upon the optical record medium and receiving a return light beam reflected by the optical record medium.

2. Description of the Related Art

There has been proposed an optical pick-up apparatus for picking-up information from a magneto-optical record medium. In general, such an information picking-up apparatus comprises a semiconductor laser emitting a linearly polarized laser beam, an objective lens for projecting the laser beam onto the magneto-optical record medium as a fine spot, an optical means for dividing a return laser beam reflected by the magneto-optical record medium into two light beams polarized in mutually orthogonal directions and a photodetecting means for receiving the two light beams. By suitably processing output signals supplied from the photodetecting means, it is possible to derive a reproduction signal representing information stored in the magneto-optical record medium, and to derive focusing error signal and tracking error signal representing a relative positional shift between the objective lens and the magneto-optical record medium.

In such a known optical pick-up apparatus, said optical means for dividing the return laser beam into the two light beams comprises a uniaxial birefringent crystal or double refraction crystal. For instance, Japanese Patent Application Publication Kokai Hei 2-37536 has proposed a known optical pick-up apparatus comprising a plane parallel plate made of birefringent material as shown in FIG. 1. As illustrated in FIG. 1, a light beam emitted by a light source 1 is divided into three beams, i.e. a single main beam and two sub-beams by means of a diffraction grating 2. These three light beams are reflected by a beams splitter 5 consisting of a half mirror 3 and a plane birefringent plate 4, and then are made incident upon an information record medium 8 by means of a collimator lens 6 and an objective lens 7. Three return beams reflected by the record medium 8 are made incident upon the beam splitter 5 by means of the objective lens 7 and collimator lens 6. Each of the three return beams is divided by the beam splitter 5 into first and second light beams which are then made incident upon photodetectors 9 and 10.

In the known optical head illustrated in FIG. 1, each of the three return beams is given with astigmatism and is divided into the first and second light beams. The first light beams of the three return beams are received by the photodetector 9 separately from one another, and the second light beam of the main beam is received by the photodetector 10. By processing the output signals from the photodetectors 9 and 10, there are produced a focusing error correction signal and a tracking error correction signal. In this prior art publication, there is not explained how to derive the reproduced information signal, but judging from an explanation with reference to FIG. 6 of the publication, it is presumed that the reproduction signal is derived from a difference between a sum of output signals from four light receiving regions of the photodetector 9 receiving the first light beam of the main beam and the output signal of the photodetector 10 receiving the second light beam of the main beam.

Japanese Patent Application Publication Kokai Sho 64-27055 has proposed another known optical pick-up apparatus comprising a wedge-shaped prism made of anisotropic crystal. As shown in FIG. 2, a laser beam emitted by a semiconductor laser 11 is converted into a parallel light beam by means of a collimator lens 12 and then is made incident upon an optical record medium 16 by means of first and second beam splitters 13 and 14 and objective lens 15. A return laser beam reflected by the record medium 16 is made incident upon the second beam splitter 14 by means of the objective lens 15, and a light flux reflected by the second beam splitter 14 is made incident upon a wedge-shaped prism 18 by means of a converging lens 17. Then, the light flux is divided into a P polarized component and an S polarized component which are separately made incident upon two light receiving regions of a photodetector 19. A part of the return beam transmitted through the second beam splitter 14 and reflected by the first beam splitter 13 is made incident upon an error detecting optical system 20.

The wedge-shaped prism 18 is made of anisotropic crystal and has incident and exit surfaces which are not parallel with each other. When the return laser beam is made incident upon the prism 18 by means of the converging lens 17, the return laser beam is divided into two beams which are subjected to astigmatism. These two beams are received by the photodetector 19 having two light receiving regions and arranged in a vicinity of a plane on which diameters of the two beams viewed in a refracting direction become minimum. It should be noted that in FIG. 2, for the sake of simplicity, the photodetector 19 is arranged behind a plane A, but in practice the photodetector is provided on the plane A. By deriving a difference between output signals from the two light receiving regions, it is possible to obtain the reproduced information signal.

In Japanese Patent Application Laid-open Publication Kokai Sho 63-161,541, there is proposed another known optical head using a composite prism element as shown in FIG. 3. In this known optical head, a laser beam emitted by a semiconductor laser 21 is made incident upon a composite prism element 23 by means of a collimator lens 22 and a light beam reflected by the composite prism element is made incident upon a magneto-optical record disk 25 by means of an objective lens 24. A return laser beam reflected by the record disk 25 is made incident upon the composite prism element 23 via the objective lens 24 and is divided into a first beam L1 composed of a P polarized component and a second beam L2 composed of an S polarized component whose polarizing direction is perpendicular to that of the P polarized component. These two light beams are made incident upon a photodetector unit 27 by means of a collimator lens 26. Output signals from the photodetector unit 27 are supplied to a signal processing unit 28 to derive reproduced information signal $S_i$, focusing error signal $S_f$ and tracking error signal $S_r$. The composite prism element 23 comprises a glass prism 29 and rock crystal or quartz prism 30 which are cemented to each other by means of a multi-coating film 31 and adhesive agent layer 32 and has a hexogonal shape.

In preliminary documents No. 3, 28a-SF-19 and 28a-SF-20 for 54th Applied Physics Conference, there disclosed "Hologram Laser Unit for CD optical pick-up".

In a known optical pick up disclosed in the preliminary document No. 3, 28a-SF-19, in a silicon substrate surface in which a photodetector (PD) is formed there is provided by etching a recess having a pyramid flastum shape and a semiconductor laser chip (LD) is arranged on a bottom surface of the recess, and the silicon substrate is provided in a package. Above this package is arranged a hologram optical element (HOE) having a grating pattern formed in a lower surface and a hologram pattern formed in an upper surface. A laser beam emitted by LD is divided into three beams by means of the grating pattern and these three beams are made incident upon an optical disk, and three return beams are subjected to the diffraction and wave surface transformation by the hologram pattern. Laser beams emanated from the hologram pattern are received by PD to detect RF signal and servo signals.

In the preliminary document No. 3, 28a-SF20, there is disclosed that a focus error signal is derived from output signals of PD in accordance with the beam size method and a tracking error signal is derived by the three-beam method.

In the known optical pick-up illustrated in FIG. 1, spot diagrams of the first and second beams of the main beam on the photodetectors 39 and 40 were calculated under the following condition: the bire-fringent plate 4 is formed by LiNbO$_3$ crystal plate having a thickness of 1.5 mm and the return beam from the information record medium 8 has a numerical aperture of 0.15. A result of this calculation is shown in FIG. 4. As can be seen from the diagram shown in FIG. 4, the spots 35a and 35b of the first and second beams impinging upon the photodetectors are not separated from each other, but are mutually overlapped. This is due to the fact that the optical axes of the first and second beams are separated in parallel with each other within the birefringent plate 4, so that a separation distance is small.

It is considered to increase the separation distance by increasing a thickness of the birefringent plate 4. Then, astigmatism and coma are increased and a size of the spots 35a and 35b becomes larger. This results in that the overlap of the spots could not be mitigated effectively.

In the known optical pick-up depicted in FIG. 2, use is made of the wedge-shape prism 18 made of anisotropic crystal, and thus exit angles of the two orthogonally polarized components emanating from the prism can be differed from each other. For instance, it has been described that the wedge-shape prism 18 is made of rutile and is arranged such that the return beam from the record medium is made incident upon the prism perpendicularly and a direction of the optical axis is set in parallel with the P polarized beam or the S polarized beam. Then, the P polarized beam and S polarized beam emanate from the prism in different directions having an angle of about 3°.

In this manner, the method of separating the beams by providing the angles between these beams is superior to the parallel separation method shown in FIG. 1. This has been confirmed by a following calculation. Now it is assumed that the wedge prism 18 is made of rutile having a thickness of 1.5 mm at a portion through which an optical axis passes, the return beam is made incident upon the prism perpendicularly and the exit surface is inclined by 10° with respect to the incident surface, and the crystal axis is set to 45° with respect to the P and S polarizing directions. Then, spot diagrams were calculated by using a thin lens having a focal length of 20 mm and a numerical aperture of 0.15 as the converging lens 17 arranged in front of the prism. A result of this calculation is represented in FIGS. 5A and 5B. FIG. 5A illustrates a spot diagram at the position A in FIG. 2 at which a diameter of the beam viewed in a direction of refraction becomes minimum, and FIG. 5B depicts a spot diagram at the position B in FIG. 2 at which a cross section of the beam becomes substantially circular.

In the publication disclosing the known optical pick-up apparatus shown in FIG. 2, there is explained that the photodetector 19 including the two light receiving regions has to be placed in a vicinity of the position at which a size of the beam viewed in the direction of refraction becomes minimum in order to receive the two return beams separately from each other. However, judging from the spot diagram illustrated in FIGS. 5A and 5B, it is not necessary to provide the photodetector at such a position. This is due to the fact that the beam is not sufficiently confined into a focus line at the position at which the beam size becomes minimum, and the P polarized component and S polarized component can be separately received from each other when these components emanate from the wedge-shaped prism 18 into different directions forming an angle of about 3° therebetween.

The known optical pick-up shown in FIG. 2 has drawbacks that there have to be provided two beam splitters, the beam splitter 14 for introducing the return beam from the record medium 16 into the optical system including the wedge-shaped prism 18 for detecting the rotation angle of the polarizing direction, and the beam splitter 13 for introducing the return beam transmitted through the beam splitter 14 into the error detecting optical system 20. This apparently results in an increase in cost and size of the optical pick-up apparatus.

In the known optical pick-up apparatus depicted in FIG. 3, since the composite prism element 23 is used, the beam splitter and analyzer may be eliminated. Therefore, the number of components of the optical pick-up can be reduced. Furthermore, in the optical pick-up apparatus shown in FIG. 3, by making the return beam from the magneto-optical disk 25 incident upon the composite prism element 23 via the objective lens 24, the first P polarized component and second S polarized beam are separated such that an optical axis of the P polarized beam makes an angle of θe in the P polarization plane of the return beam with respect to a normal to a boundary surface between the glass prism 29 and the quartz prism 30 constituting the composite prism element 23 and an optical axis of the S polarized beam makes angle of θo in the P polarization plan of the return beam with respect to said normal to the boundary surface between the prisms 29 and 30 (here θe>θo).

The light beam incident upon the objective lens 24 has been converted into the parallel beam by means of the collimator lens 22, and thus the return beam impinging upon the composite prism element 23 is also a parallel beam. Therefore, the first P polarized beam and S polarized beam emanating from the composite prism element 23 have no aberration, so that the beams impinging upon the photodetector unit 27 via the common lens 26 are converged as very fine spots which are sufficiently separated from each other on the photodetector unit.

However, in the known optical pick-up apparatus illustrated in FIG. 3, the first and second return beams separated by the composite prism element 23 are made incident upon the photodetector unit 27 by means of the common converging lens 26, and therefore it is necessary to form a space which corresponds to a focal length of the converging lens and the whole pick-up apparatus is liable to be large in size. Moreover, in the photodetector unit 27, a center of a group of light receiving regions receiving the first return beam has to be coincided with the optical axis of the first return beam and a center of a group of light receiving regions receiving the second return beam has to be aligned with the optical axis of the second return beam, so that a rather strict adjustment of positions of various parts is required and this results in an increase in cost.

Furthermore, in the publication disclosing the optical pick-up apparatus shown in FIG. 3, there is explained that shapes of spots of the first and second return beams on the photodetector unit are detected and a focusing error signal is derived on the basis of detected beam spot shape. However, there is not explained at all in what way the beam spot shape of the first and second return beams changes.

In the optical pick-up apparatus shown in FIG. 3, since the laser beam emitted by the semiconductor laser 21 is converted into the parallel beam by means of the collimator lens 22 and then is made incident upon the magneto-optical disk 25 by means of the objective lens 24, when the objective lens becomes in defocus condition, the return beam impinging upon the composite prism element 23 is no more parallel. Therefore, when the return beam is transmitted through the composite prism element 23, there is introduced aberration. This aberration becomes manifest when a difference in refractive index between the glass prism 29 and the quartz prism 30 of the composite prism element 23 is large even if a degree of defocus is small. Then, the beam spots of the first and second return beams on the photodetector unit become too large to be detected separately from each other.

In the "Hologram Laser Unit for CD optical pick-up" disclosed in the above mentioned preliminary documents No. 3, 28a-SF-19 and 28a-SF-20 for 54th Applied Physics Conference, there are not provided a means for dividing the return beam from the record medium into the two mutually orthogonally polarized beams and a means for detecting a change in intensity of these divided beams, and thus this known apparatus could not be applied to the magneto-optical record medium.

FIG. 6 is a perspective view showing another known optical pick-up apparatus described in Japanese Patent Application Publication Kokai Hei JP 1-315721. In this known optical pick-up apparatus, a laser beam 42 emitted by a semiconductor laser 41 is converted by a collimator lens 43 into a parallel beam 44 and is made incident upon a beam splitter 45. The laser beam reflected by a reflection surface 45a of the beam splitter 45 is further reflected by a mirror 46 and is made incident upon a magneto-optical record disk 48 by means of an objective lens 47. A laser beam 49 reflected by the magneto-optical disk 48 is converted into a parallel beam 50 by means of the objective lens 47 and is then reflected by the mirror 46 toward the beam splitter 45. A parallel laser beam 51 transmitted through the reflection surface 45a is converged by means of a detection lens 52 and a concave lens 53 into a converging beam 54. Then, the converging beam 54 is made incident upon a polarizing beam splitter 55 and is divided thereby into P and S polarized components, and these components are received by a photodetector 56.

FIG. 7 is a schematic view showing the construction and operation of the polarizing beam splitter 55. The polarizing beam splitter 55 comprises a parallelogram prism 55b, a first transparent plane parallel plate 55c provided on one surface of the prism 55b via a polarizing film 55a which transmits the P polarized component and reflects the S polarized component, said plane parallel plate being made of an optical material having the same refractive index as that of the prism 55b and having a total reflection surface 55d. The polarizing beam splitter 55 further comprises a second transparent plane parallel plate 55f secured to other surface of the prism 55b via an anti-reflection film 55e and having a total reflection surface 55g, said second plane parallel plate being made of an optical material having a refractive index different from that of the parallelogram prism 55b. The polarizing beam splitter 55 is arranged such that an incident plane for the incident laser beam 54 is rotated by 45 degrees with respect to the polarizing direction of the laser beam emitted by the semiconductor laser 41.

In this known optical pick-up apparatus, the laser beam 54 impinging upon the polarizing beam splitter 55 is divided by the polarizing film 55a into a P polarized component transmitted through the polarizing film and an S polarized component reflected by the polarizing film. The P polarized beam transmitted through the polarizing film 55a is reflected by the total reflection surface 55d of the plane parallel plate 55c and is transmitted through again the polarizing film 55a. In this manner, the P and S polarized components are made incident upon the plane parallel plate 55f made of a material having different refractive index from that of the parallelogram prims 55b and are reflected by the total reflection surface 55g. In this manner, the P and S polarized beams 54a and 54b each having astigmatism emanate from the polarizing beam splitter 55 separately from each other.

The P and S polarized beams 54a and 54b are detected by the photodetector 56 and outputs of the photodetector are suitably processed to derive a focusing error signal in accordance with the astigmatism method as well as a reproduced RF signal by deriving a difference in intensity between the P and S polarized beams.

In the known optical pick-up apparatus shown in FIG. 6, the polarizing beam splitter 55 also serves to give the divided P and S polarized beams 54a and 54b the astigmatism, and thus the number of elements can be reduced. However, in order to detect the information from the magneto-optical disk 48, it is necessary to arrange the polarizing beam splitter 55 to be rotated by 45 degrees with respect to the polarizing plane of the laser beam 42 emitted by the semiconductor laser 41. This results in that the adjustment or assembly becomes complicated. Further, since the incident beam path and the return beam path are separated by the beam splitter 55, the optical elements of the incident path side and the optical elements of the return beam side are arranged at right angles and thus the whole size of the pick-up apparatus is liable to be large.

FIGS. 8 and 9 illustrate another known optical pick-up apparatus for reading the information out of the magneto-optical information record medium described in Japanese Patent Application Publication Kokai Hei 5-120755. In this known pick-up apparatus, a laser beam produced by a semiconductor laser 62 mounted on a silicon substrate 61 is reflected upwardly by a mirror 64 provided on the silicon substrate. The laser beam is then made incident upon a magneto-optical record medium 67 by means of a hologram element 65 and an objective lens 66. The hologram element 65 includes a first hologram 65a provided on a surface of the hologram element which faces with the silicon substrate 61, said first hologram having gratings extending in a direction substantially parallel with a direction X of an information track on the magneto-optical record medium 67 and further having a lens function for giving opposite refractive powers to ±1-order diffracted beams, and a second hologram 65b provided on a surface opposite to said surface 65a and having gratings which extend substantially in parallel with a direction Y which is perpendicular to the track direction X. 0-order beams transmitted through these first and second holograms 65a and 65b are made incident upon the magneto-optical record medium 67 by means of the objective lens 66.

The return beam reflected by the magneto-optical record medium 67 is made incident by the objective lens 66 upon the second hologram 65b of the hologram element 65 and ±1 order beams diffracted thereby are received by third and fourth photodetectors 63C and 63D formed on the silicon substrate 61 via first and second polarizing beam splitting elements 68A and 68B including first and second fine gratings 68a and 68b, respectively. The first and second polarizing beam splitting elements 68A and 68B are provided on the third and fourth photodetectors 63C and 63D, respectively, and the first and second fine gratings 68a and 68b are formed to be inclined by ±45 degrees with respect to the direction Y, so that they degrees with respect to the direction Y, so that they cross with each other at right angles. Each of the third and fourth photodetectors 63C and 63D includes two light receiving regions 63g, 63h and 63i, 63j which are bisected along a line extending in the direction X.

In this manner, the 0-order beams transmitted through the first and second fine gratings 68a and 68b are received by the third and fourth photodetectors 63C and 63D, and output signals of these photodetectors are processed to derive the RF reproduced information signal and the tracking error signal by the push-pull method.

The 0-order return beam transmitted through the second hologram 65b is made incident upon the first hologram 65a and is divided thereby into ±1-order diffracted beams having opposite focal powers. Then, these ±1 order diffracted beams are received by the first and second photodetectors 63A and 63B separately from each other. Here, each of the first and second photodetectors 63A and 63B includes three light receiving regions 63a, 63b, 63c, 63d, 63e, 63f divided along lines extending in the direction Y. In this manner, by processing output signals from the first and second photodetectors 63A and 63B, it is possible to derive the focusing error signal in accordance with the beam size method.

In Japanese Patent Application Publication Kokai Hei 3-212828, there is disclosed still another known optical pick-up apparatus. As shown in FIG. 10, various optical elements such as semiconductor laser 71, trapezoidal prism 72 and photodetectors 73a, 73b are arranged within a package 74. The trapezoidal prism 72 is made of a birefringent material and its upper surface 72a is inclined by 45 degrees with respect to an optical axis and a half mirror 75 is provided on this surface. A laser beam emitted by the semiconductor laser 71 is made incident upon the half mirror 75 and a laser beam reflected by the half mirror is transmitted through a transparent glass window 76 formed in the package 74. The laser beam is then made incident upon a magneto-optical record medium 78 by means of an objective lens 77. A return laser beam reflected by the magneto-optical record medium 78 is converged by the objective lens 77, is transmitted through the glass window 76 and is made incident upon the half mirror 75. A return beam transmitted through the half mirror 75 is made incident upon the trapazoidal prism 72 and emanates from the prism from its lower surface 72b, thereby being subjected to astigmatism as well as being divided into two orthogonally polarized beams which are then received by the photodetectors 73a and 73b each having four divided light receiving regions.

It is possible to derive a focusing error signal by processing output signals from the first and second photodetectors 73a and 73b in accordance with the astigmatism method and a RF reproduced signal can be obtained by deriving a total sum of the output signals of the four light receiving regions of the second photodetector 73b.

In the known optical pick-up apparatus illustrated in FIG. 8, the focusing error signal and the RF information signal are derived by detecting the laser beam diffracted by the first hologram 65a and the laser beam diffracted by the second hologram 65b separately from each other, and thus the detection of the focusing error signal is not influenced by the first and second polarizing beam splitting elements 68A and 68B and the focusing error signal can be obtained precisely and accurately. Moreover, since the light receiving region dividing lines of the photodetectors 63A and 63B are in parallel with the diffracting direction of the corresponding gratings, a movement of the spots on the photodetectors due to change in a wavelength of the laser beam may be in parallel with the dividing lines. Therefore, even if the wavelength of the laser beam fluctuates, there is not produced an off-set in the tracking error signal and focusing error signal.

However, the inventors have found that this known optical pick-up apparatus has still the following disadvantages.

In general, in order to record information on the magneto-optical record medium and to erase the information recorded on the magneto-optical record medium, it is necessary to irradiate the record medium with the light spot having a high intensity. To this end, it is necessary to increase the transmissivity of the first and second holograms 65a and 65b for the 0-order beam (for instance not less than 70%), so that the laser beam from the semiconductor laser 62 can be focused on the magneto-optical record medium 67 through the hologram element 65 and objective lens 66 in an efficient manner.

However, if the transmissivity of the hologram element 65 for the 0-order beam is increased, the diffracting efficiency for the ±1-order beams becomes low (not higher than 70%), an amount of the ±1-order return beams diffracted by the second hologram 65b becomes very small, and almost all the return beam containing the signal component is transmitted through the second hologram 65b as the 0-order beam. Therefore, a loss of the signal component is too small to detect the RF information signal from the magneto-optical record medium at a high C/N.

In the above mentioned Japanese Patent Application Publication Kokai Hei 3-212828 disclosing the known optical pick-up apparatus illustrated in FIG. 10, page 4, left lower column, there is described that a detectable range δ of the focusing error may be expressed by the following equation:

$$\delta = \frac{(n^2-1)}{n^3(\sqrt{(2n^2-1)+1})} \cdot L \cdot M^2 \quad (1)$$

wherein L is a distance between the upper and lower surfaces 72a and 72b of the trapezoidal prism 72, n is a refractive index of the prism 72 and M is a lateral magnification of the objective lens 77. In the same publication, page 4, right upper column, there is shown an example, in which M=⅕, L=2.0–3.0 mm, and a detectable range of the focusing error becomes 10–15 μm which is comparable to currently used optical pick-up apparatuses.

There has been no consideration for a case in which the trapezoidal prism 72 is made of birefringent material, but it is now assumed that the trapezoidal prism is made of quartz. A refractive index of the quartz for ordinary light is about 1.539 and that for extraordinary light is about 1.548. As explained above, when the magneto-optical record medium is used, the laser beam emitted by the semiconductor laser 71 has to be focused onto the record medium at a relatively high efficiency, so that the lateral magnification M of the objective lens 77 has to be about 0.273. By considering the above matters, the equation (1) is solved for L by setting δ=10 μm, n=1.539 and M=0.273. Then, L=1.05 mm is obtained. In the equation (1), it is questionable why the numerical aperture of the objective lens 77 is not contained as a parameter. Now a spot diagram on the photodetectors 73a and 73b is calculated by using the above values. Then, a spot diagram shown in FIG. 11 can be obtained. As depicted in FIG. 11, on the photodetectors, the ordinary light spot and extraordinary light spot overlap each other and thus they could not be detected separately.

In the above publication, there is also shown a trapezoidal prism 72 consisting of two triangle or trapezoidal prisms 72-1 and 72-2 made of different birefringent materials as shown in FIG. 12. Then, the P and S polarized beams are separated from each other by a larger angle so that they may be detected separately from each other by the photodetectors 73a and 73b. In this case, if the focusing error is to be detected by the astigmatism method which is most common in optical pick-up apparatuses for optical information reproducing apparatuses, the material of the prisms and a value of L have to be set to obtain a given astigmatism, and thus the P and S polarized return beams could not be detected separately from each other.

Therefore, even if a difference between a sum of output signals of the four light receiving regions of the first photodetector 73a and a sum of output signals of the four light receiving regions of the second photodetector 73b is derived, it is impossible or difficult to derive the information signal from the magneto-optical record medium 78.

Moreover, in the known optical pick-up apparatus illustrated in FIG. 10, the return laser beam reflected by the magneto-optical record medium 78 is made incident upon the trapezoidal prism 72 by means of the half mirror 75, and therefore a half of the return beam is lost by the half mirror.

SUMMARY OF THE INVENTION

The present invention has for its object to provide a novel and useful optical pick-up apparatus, in which the return beam reflected by the magneto-optical record medium can be divided into two orthogonally polarized beams by using the birefringent crystal without using a special beam splitter.

It is another object of the invention to provide an optical pick-up apparatus, in which the apparatus can be composed of a smaller number of elements in an easy and accurate manner and thus can be small in size and cheap in cost.

It is still another object of the invention to provide an optical pick-up apparatus, in which a loss of the magneto-optic signal component can be decreased and the two orthogonally polarized beams can be positively detected separately from each other, so that the RF reproduced information signal can be obtained at high C/N.

According to the present invention, an optical pick-up apparatus comprises:

a light source means for emitting a linearly polarized light beam;

an optical means including a uniaxial birefringent crystal member having a surface and a polarizing film provided on said surface of the uniaxial birefringent crystal member, said polarizing film being arranged such that said light beam emitted by said light source means is made incident upon the polarizing film;

a converging means for converging the light beam emitted by said light source means and reflected by said polarizing film of the optical means, directing the thus converged light beam onto a magneto-optical information record medium and directing a return light beam reflected by said magneto-optical information record medium toward said polarizing film;

a hologram means for dividing said return beam reflected by the magneto-optical information record medium into at least two light beams;

a first photodetecting means for receiving two mutually orthogonally polarized return beams transmitted through said polarizing film and refracted by said uniaxial birefringent crystal member, an information signal being reproduced by processing output signals from said first photodetecting means; and a second photodetecting means for receiving said at least two light beams emanating from said hologram means, an positional error signal including at least a focusing error signal being obtained by processing output signals from said second photodetecting means.

In a preferable embodiment of the optical pick-up apparatus according to the invention, said optical means comprises a glass member which is applied on said polarizing film provided on said surface of the uniaxial birefringent crystal.

According to the invention, it is preferable to arrange said first photodetecting means in a vicinity of a plane on which focal lines of the ordinary light beam and extraordinary light beam are formed.

BRIEF DESCRIPTION OF THE DRAWINGS

FIG. 1 is a schematic view showing a known optical pick-up apparatus for reproducing information out of a magneto-optical record medium;

FIG. 2 is a schematic view illustrating another known optical pick-up apparatus;

FIG. 3 is a schematic view depicting another known optical pick-up apparatus;

FIGS. 4, 5A and 5B are spot diagrams explaining the function of the apparatuses shown in FIGS. 1 and 3;

FIG. 6 is a schematic view showing another known optical pick-up apparatus;

FIG. 7 is a schematic view illustrating the polarizing beam splitter of the apparatus shown in FIG. 6;

FIG. 8 is a schematic view depicting another known optical pick-up apparatus;

FIG. 9 is a plan view depicting the photodetector of the apparatus illustrated in FIG. 8;

FIG. 10 is a schematic view representing another known optical pick-up apparatus;

FIG. 13 is a schematic view illustrating a first embodiment of the optical pick-up apparatus according to the invention;

FIG. 14 is a plan view of the silicon substrate of the apparatus shown in FIG. 13;

FIG. 15 is a side view showing the silicon substrate;

FIG. 16 is a plan view of the hologram element of the apparatus shown in FIG. 13;

FIG. 17 is a plan view illustrating the hologram pattern of the apparatus of FIG. 13;

FIG. 18 is a plan view showing the photodetector of the apparatus shown in FIG. 13;

FIG. 19 is a schematic view depicting a second embodiment of the invention;

FIG. 21 is a schematic view showing a third embodiment of the invention;

FIG. 22 is a plan view illustrating a photodetector of the apparatus of FIG. 21;

FIG. 23 is a plan view depicting a hologram of the apparatus of FIG. 21;

FIG. 25 is a plan view of a hologram of the apparatus shown in FIG. 24;

FIG. 26 is a plan view of a photodetector of the apparatus of FIG. 26;

FIG. 29 is a schematic view depicting a sixth embodiment of the apparatus according to the invention;

FIG. 30 is a schematic view illustrating a composite optical unit of the apparatus of FIG. 29;

FIG. 31 is a plan view showing a semiconductor substrate of a seventh embodiment of the present invention;

FIG. 32 is a schematic cross sectional view of the semiconductor substrate of FIG. 31;

FIG. 40 is a schematic view of a major portion of a twelfth embodiment of the invention;

FIG. 41 is a schematic view of a major portion of a thirteenth embodiment of the invention;

FIG. 42 is a schematic view of a major portion of a fourteenth embodiment of the invention;

FIG. 43 is a plan view showing a semiconductor substrate of a fifteenth embodiment of the invention;

FIG. 44 is a plan view of a hologram of the fifteenth embodiment;

FIG. 48 is a schematic view of a semiconductor substrate of the seventeenth embodiment of the invention;

FIG. 49 is a schematic view of a major portion of an eighteenth embodiment of the invention;

DESCRIPTION OF THE PREFERABLE EMBODIMENTS

Figure 11:
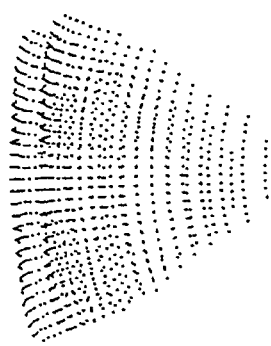
FIG. 11 is a spot diagram of the apparatus shown in FIG. 10.
Figure 12:
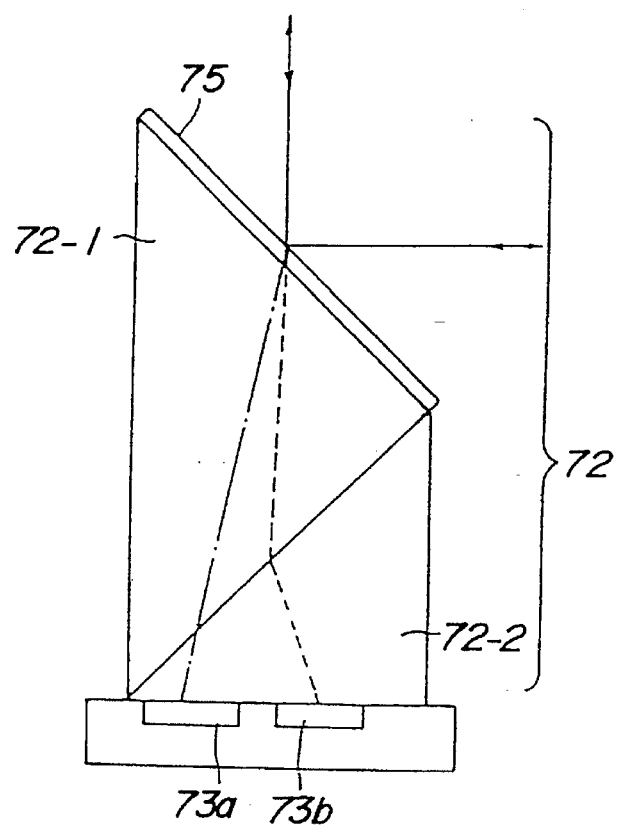
FIG. 12 is a schematic view showing another known optical pick-up apparatus.

FIGS. 13 to 18 show a first embodiment of the optical pick-up apparatus according to the invention. The optical pick-up apparatus of the present embodiment comprises a hologram laser unit 92, triangular glass prism 85, polarizing film 87, uniaxial birefringent crystal member in the form of a triangular quartz prism 86, objective lens 88 and first and second photodetectors 90 and 91.

The hologram laser unit 92 itself is known and may be the "Hologram Laser Unit for CD optical pick-up" disclosed in the above mentioned preliminary documents No. 3, 28a-SF-19 and 28a-SF-20 for 54th Applied Physics Conference. As shown in FIG. 14, the hologram laser unit 92 comprises a silicon substrate 82 and ten light receiving regions 82a to 82j are formed on a surface of the silicon substrate. As illustrated in FIG. 15, in the surface of the silicon substrate 82 there is further formed a recess 82k by etching and a semiconductor laser 81 is arranged on a bottom of the recess. The recess 82k has a pyramid frustum shape and has one surface 821 formed as a mirror which reflects a laser beam emitted by the semiconductor laser 81 upwardly. In order to increase the reflectance of this surface 821, gold is coated on this surface. In the present embodiment, the semiconductor laser 81 is formed by a high power laser which can emit the laser beam having an output power not less than 30 mW.

Above the silicon substrate 82 there is arranged a hologram element 84 via a spacer 83. As best shown in FIGS. 16 and 17, the hologram element 84 comprises a grating 84c formed in a surface 84a which faces with the silicon substrate 82 and a hologram pattern 84d formed on an opposite surface 84b, said hologram pattern being slightly curved.

In this manner, the linearly polarized laser beam emitted by the semiconductor laser 81 is reflected by the surface 821 in a direction substantially perpendicular to the silicon substrate 82 and then is divided by diffraction into a single main beam and two sub-beams by means of the linear grating 84c formed in the hologram element 84. Then these three laser beams are transmitted through the hologram pattern 84d as 0-order beams.

The three 0-order beams emanating from the hologram laser unit 92 are made incident upon the polarizing film 87 as diverging S polarized beams via the glass prism 85. The glass prism 85, polarizing film 87 and quartz prism 86 made of uniaxial birefringent crystal are formed as a single integral body by cementing the glass prism and quartz prism to each other via the polarizing film. The polarizing film 87 is formed to have such a property that a reflecting coefficient for the S polarized component is not less than 50% and that for the P polarized component is not larger than 20%. Therefore, 50% or more of the incident S polarized three beams are reflected by the polarizing film 87 and remaining parts of these beams are received by the photodetector 91 via the quartz prism 86. An output signal of the photodetector 91 is processed by a laser power control circuit 95 to perform the auto-power control for stabilizing the output power of the laser beam emitted by the semiconductor laser 81.

The three beams reflected by the polarizing film 87 are transmitted through the glass prism 85 and then are made incident upon the magneto-optical record medium 89 as fine spots by means of the objective lens 88.

Three return beams reflected by the magneto-optical record medium 89 are collected by the objective lens 88 and are made incident upon the polarizing film 87 as converging beams via the glass prism 85. Parts of the three return beams are transmitted through the polarizing film 87 and are made incident upon the quartz prism 86 and remaining parts of the three return beams are reflected by the polarizing film and are made incident upon the hologram laser unit 92 via the glass prism 85. The quartz prism 86 is arranged such that its optic axis 86a is in a plane perpendicular to an optical axis of the main return beam and is inclined by 45 degrees with respect to the polarizing direction of the S polarized component. Therefore, the main return beam transmitted through the polarizing film 87 and made incident upon the quartz prism 86 is divided into an ordinary light beam and an extraordinary light beam.

The ordinary and extraordinary light beams of the main return beam are received by the photodetector 90 independently from each other. To this end, the photodetector 90 includes two light receiving regions 90a and 90b, one for receiving the ordinary light beam and the other for receiving the extraordinary light beam as illustrated in FIG. 18. On these light receiving regions 90a and 90b, there are formed spots 93 and 94, respectively having aberrations.

On the magneto-optical record medium 89, information is recorded as magnetizing directions, so that the polarizing direction of the main return beam reflected by the record medium is slightly rotated in accordance with the magnetizing directions due to the Kerr effect. This slight change in the polarizing direction is transformed into a change in the angle with respect to the optic axis 86a of the quartz prism 86, and thus intensities of the ordinary light beam and extraordinary light are changed. Therefore, by detecting a difference between output signals from the light receiving regions 90a and 90b in a reproduction circuit 96, it is possible to derive the RF reproduced information signal.

The spots 93 and 94 formed on the light receiving regions 90a and 90b are subjected to astigmatism and coma due to a difference in a refractive index between the glass prism 85 and quartz prism 86. If these aberrations are large, a size of the spots 93 and 94 becomes large and it is no longer possible to detect these spots separately from each other. Therefore, it is desired that the difference in refractive index between the glass prism 85 and the quartz prism 86 is as small as possible. In the present embodiment, the quartz prism 85 is used as the uniaxial birefringent crystal and quartz has refractive indices for the ordinary light and extraordinary light of about 1.539 and 1.548, respectively, and the glass prism 85 is made of a glass having a refractive index from 1.539 to 1.548. Therefore, the astigmatism and coma can be suppressed sufficiently. The glass prism 85 may be made of optical glasses BAL21 and BAL23 manufactured and sold by Ohara company.

The three return beams reflected by the polarizing film 87 are made incident upon the hologram element 84 in the hologram laser unit 92 and are diffracted by the hologram pattern 84d. ±1-order beams emanating from the hologram pattern 84d have image point shifts in opposite directions along the optical axis and are made incident upon the ten light receiving regions 82a to 82j formed on the silicon substrate 82. That is to say, a +1-order main beam is made incident upon three light receiving regions 82b, 82c and 82d, a +1-order beam of one of the two sub-beams are made incident upon the light receiving region 82a, a +1-order beam of the other sub-beam is made incident upon the light receiving region 82e, a −1-order main beam is made incident upon the three light receiving regions 82g, 82h and 82i, a −1-order beam of the one sub-beam is made incident upon the light receiving region 82f, and a −1-order beam of the other sub-beam is made incident upon the light receiving region 82j.

In order to derive the positional error signal of the beam spots with respect to an information track on the magneto-optical record medium 89, output signals of the above mentioned light receiving regions 82a to 82j are supplied to a servo control circuit 97. The focusing error signal FES can be derived from the main return beam reflected by the magneto-optical record medium 89. Now it is assumed that outputs of the ten light receiving regions 82a to 82j are Ia to Ij. Then, the focusing error signal FES may be derived by the beam size method as described in the above mentioned preliminary document No. 3, 28a-SF-20 for 54th Applied Physics Conference in the following manner:

$$FES=(Ib+Id+Ih)-(Ic+Ig+Ii) \qquad (2)$$

A tracking error signal TES can be derived by the three beam method in the following manner:

$$TES=(Ia+If)+(Ie+Ij) \qquad (3)$$

In the present embodiment, the return beams reflected by the magneto-optical record medium 89 are converged by the objective lens 88 and the thus converged laser beams are made incident upon the polarizing film 87, and therefore it is no longer necessary to provide a special converging lens such as the lens 26 of the known optical pick-up apparatus shown in FIG. 3. This results in a decrease in cost and size. Moreover, as illustrated in FIG. 18, the ordinary light beam spot 93 and extraordinary light beam spot 94 are separated from each other by a sufficient distance, and therefore, the strict position adjustment which would be required in the known optical pick-up apparatus illustrated in FIG. 3 is no longer required. That is to say, the beam spots 93 and 94 should not be positioned in a strictly correct manner with respect to the light receiving regions 90a and 90b, so that the manufacturing cost of the optical pick-up apparatus according to the invention can be reduced.

In the known optical pick-up apparatuses shown in FIGS. 1 and 3, the reproduced information signal and focusing error signal are detected by the same light receiving regions so as to reduce apparatus size. In the present embodiment, the return beam reflected by the magneto-optical record medium 89 is reflected by the polarizing film 87 and the focusing error signal is derived by the hologram laser unit 92. In this case, a size of apparatus is not increased too much. However, by utilizing the hologram laser unit 92, it is no longer necessary to adjust the position of the light receiving regions of the focusing error detecting photodetector, and this merit is much more important.

The first embodiment so far explained may be modified in various ways. The uniaxial birefringent crystal other than quartz such as lithium niobate, rutile, calcite, KDP ($KH_2PO_4$), ADP ($NH_4H_2PO_4$) and $MgF_2$ may be used as the uniaxial birefringent prism. Among these materials, lithium niobate and rutile have rather higher refractive indices. Normally used optical glasses have refractive indices at most 1.8. Therefore, if use is made of an uniaxial birefringent crystal having a refractive index higher than 1.8, it is desired in a point of aberrations to construct the glass prism 85 secured to the uniaxial birefringent prism 86 via the polarizing film 86 from an optical glass having a refractive index higher than 1.6.

Furthermore, the hologram laser unit 92 may be secured to the glass prism 85. Similarly, at least one of the photodetectors 90 and 91 may be fixed to the uniaxial birefringent prism 86 directly or via a spacer. In case of direct securing, use may be made of transparent or semi-transparent UV cure type adhesive agent. When use is made of the spacer, the spacer may be formed by a mold of resin which serves to seal the photodetector.

Figure 20:
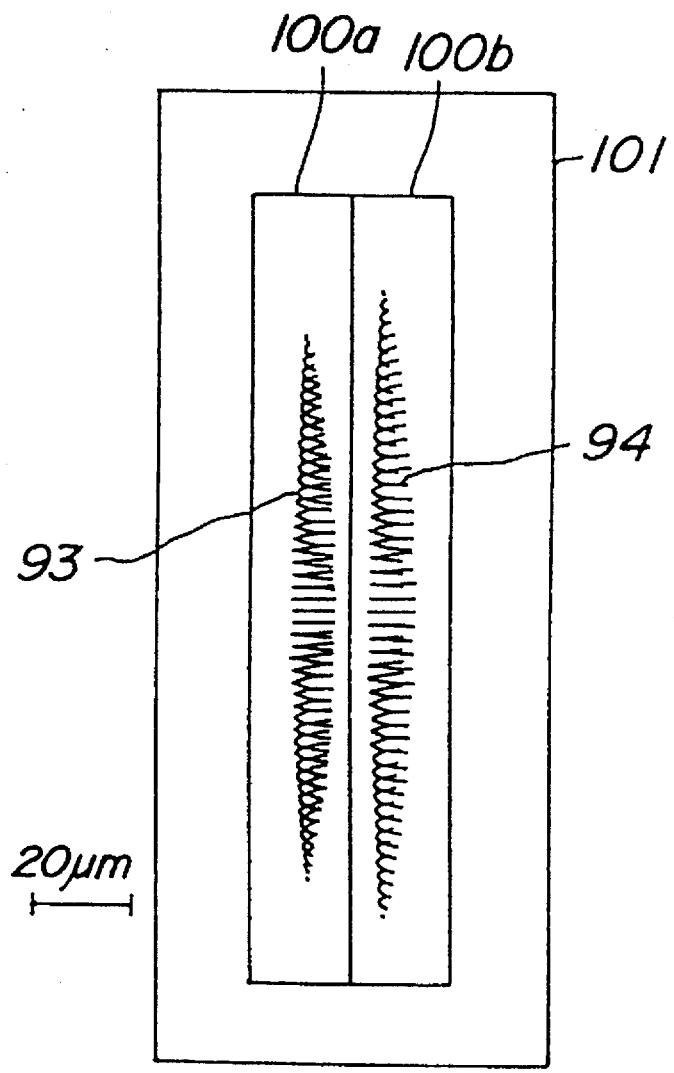
FIG. 20 is a plan view of the photodetector shown in FIG. 19.

FIGS. 19 and 20 are schematic views showing a second embodiment of the optical pick-up apparatus according to the invention. In the present embodiment, portions similar to those of the previous embodiment shown in FIG. 13 are denoted by the same reference numerals used in FIG. 13. In the present embodiment, a transparent parallel plate 98 made of lithium niobate is used as the uniaxial birefringent crystal, and a polarizing film 99 is applied on one surface of the lithium niobate plate 98. The three laser beams emanating from the hologram laser unit 92 are made incident upon the polarizing film 99 as S polarized components, and three beams reflected by the polarizing film 99 are made incident upon the magneto-optical record medium 89 by means of the objective lens 88 as fine spots. The laser beams transmitted through the polarizing film 99 are received by the photodetector 91 via the lithium niobate plate 98. By processing the output signal of the photodetector 91, the output power of the laser beam emitted by the semiconductor laser can be controlled automatically like the first embodiment.

The three return beams reflected by the magneto-optical record medium 89 are converged by the objective lens 88 and are made incident upon the polarizing film 99 as the converged light beams. The return beams transmitted through the polarizing film 99 are made incident upon the lithium niobate plate 98 and the return beams reflected by the polarizing film are made incident upon the hologram laser unit 92 to obtain the focusing and tracking error signals in the same manner as the first embodiment.

The lithium niobate plate 98 is formed such that its optic axis 98a is in parallel with the plane of the polarizing film 99 and is inclined by 45 degrees with respect to the polarizing direction of the S polarized component. Therefore, the return beam transmitted through the polarizing film 99 and made incident upon the lithium niobate plate 98 is divided into the ordinary light and extraordinary light. The ordinary and extraordinary light beams emanating from the lithium niobate plate 98 are received by a photodetector 100 separately from each other, said photodetector being arranged within a mold of resin 101. As illustrated in FIG. 20, the photodetector 100 comprises a light receiving regions 100a receiving the ordinary light and a light receiving region 100b receiving the extraordinary light.

A distance of separation of the ordinary light and extraordinary light is small and further the spots 93 and 94 of the ordinary light and extraordinary light are subjected to astigmatism and coma upon the refraction by the lithium niobate plate 98. Therefore, it is preferable to arrange the photodetector 100 in a vicinity of a position at which focal lines of the ordinary light and extraordinary light are formed due to the astigmatism. Moreover, in order to correct the coma, the photodetector 100 is preferably arranged to be inclined by 45 degrees with respect to the optical axis of the main return beam in a direction opposite to the lithium niobate plate 98. A glass plate may be arranged between the lithium niobate plate 98 and the photodetector 100 such that the glass plate is tilted in a opposite direction with respect to the lithium niobate plate. Then, the coma can be effectively corrected.

Also in the present embodiment, a change in the polarizing direction of the return beam reflected by the magneto-optical record medium 89 due to the Kerr effect is transformed into a change in an angle with respect to the optic axis 98a of the lithium niobate plate 98, so that the intensity of the ordinary light and extraordinary light separated by the lithium niobate plate is changed. Thus, by detecting a difference between the output signals of the light receiving regions 100a and 100b, it is possible to obtain the reproduced RF information signal in a similar manner to the first embodiment.

In the present embodiment, since the photodetector 100 is arranged in a vicinity of the position at which the focal lines of the ordinary light and extraordinary light separated by the lithium niobate plate 98 are formed, although the separation distance between the ordinary light and the extraordinary light is small, they can be detected in a positively separated manner as compared with the known optical pick-up apparatus illustrated in FIG. 1. It should be noted that in the first embodiment, the ordinary light and the extraordinary light are separated from each other at a certain angle, and thus it is not necessary to arrange the photodetector in a vicinity of the focal lines.

FIGS. 21 and 22 are schematic views showing a third embodiment of the optical pick-up apparatus according to the invention. In the present embodiment, use is made of a lithium niobate prism 102 as the uniaxial birefringent crystal. Similar to the first embodiment, a light transmissive polarizing film 103 is applied on a surface of the prism 102 and the photodetector 91 is secured to another surface of the prism. The hologram laser unit 92 and lithium niobate prism 102 are provided on a upper surface of a glass plate 104 having a refractive index of 1.82, and a photodetector 105 having two light receiving regions 105a and 105b as shown in FIG. 22 is secured to a lower surface of the glass plate.

In the present embodiment, the three laser beams emanating from the hologram laser unit 92 are made incident upon the polarizing film 103 as S polarized components, and three beams reflected by the polarizing film 103 are made incident upon the magneto-optical record medium 89 by means of the objective lens 88 as fine spots. The laser beams transmitted through the polarizing film 103 are received by the photodetector 91 via the lithium niobate prism 102. By suitably processing the output signal of the photodetector 91, the output power of the laser beam emitted by the semiconductor laser can be controlled automatically.

The three return beams reflected by the magneto-optical record medium 89 are converged by the objective lens 88 and are made incident upon the polarizing film 103 as the converged light beams. The return beams transmitted through the polarizing film 103 are made incident upon the lithium niobate prism 102 and the return beams reflected by the polarizing film are made incident upon the hologram laser unit 92 to obtain the focusing and tracking error signals in the same manner as the first embodiment.

The lithium niobate prism 102 is formed such that its optic axis 102a is in parallel with the plane perpendicular to the optical axis of the main return beam and is inclined by 45 degrees with respect to the polarizing direction of the S polarized component. Therefore, the return beam transmitted through the polarizing film 103 and made incident upon the lithium niobate prism 102 is divided into the ordinary light and extraordinary light. The ordinary and extraordinary light beams emanating from the lithium niobate prism 102 are received by the photodetector 105 separately from each other.

Here, the spots 93 and 94 of the ordinary light and extraordinary light have the astigmatism and coma, and thus the photodetector 105 is arranged on the lower surface of the glass plate 104 such that the photodetector is in a vicinity of a position at which focal lines of the ordinary light and extraordinary light are formed due to the astigmatism.

Also in the present embodiment, a change in the polarizing direction of the return beam reflected by the magneto-optical record medium 89 due to the Kerr effect is transformed into a change in an angle of the polarizing direction with respect to the optic axis 102*a* of the lithium niobate prism 102, so that the intensity of the ordinary light and extraordinary light separated by the lithium niobate plate is changed. Thus, by detecting a difference between the output signals of the light receiving regions 105*a* and 105*b* of the photodetector 105, it is possible to obtain the reproduced RF information signal in a similar manner to the first embodiment.

In the present embodiment, the astigmatism and coma introduced by the lithium niobate prism 102 are large, but the ordinary light and extraordinary light can be detected separately from each other in a positive manner, because the photodetector 105 is arranged in a vicinity of the focal lines of the ordinary light and extraordinary light due to the astigmatism.

In this third embodiment, the glass prism is dispensed with as compared with the first embodiment, so that the cost can be reduced accordingly.

In the present embodiment, the ordinary light and extraordinary light separated by the lithium niobate prism 102 are detected by the photodetector 105 via the glass plate 104, but the photodetector 105 may be directly secured to the lower surface of the lithium niobate prism 102. In any case, it is not desirable to form an air layer between the lithium niobate prism 102 and the photodetector 105, because the lithium niobate has rather high refractive indices for the ordinary light and extraordinary light. If there is formed an air layer, parts of the ordinary light and extraordinary light separated by the lithium niobate prism 102 might be totally reflected by the exit surface of the prism. If use is made of other uniaxial birefringent crystals having sufficiently low refractive indices instead of the lithium niobate, an air layer may be provided between the birefringent crystal and the photodetector.

In the first to third embodiments so far explained, the tracking error signal is detected by the hologram laser unit 92, but the tracking error signal may be derived by processing the output signals of the photodetectors 90, 100 and 105 for deriving the reproduced RF information signal. In this case, there are provided light receiving regions in these photodetectors such that the light receiving regions receive either one or both of ordinary light and extraordinary light of the two sub-beams. Then, the tracking error signal may be derived by detecting a difference in intensity between the two sub-beams by means of the three beam method.

Further, the tracking error signal may be derived by the hologram laser unit 92 by the push-pull method. In this case, the linear grating 84*c* formed in the hologram element 84 and the light receiving regions 82*a*, 82*e*, 82*f* and 82*j* are dispensed with and the optical pick-up apparatus is arranged such that the direction of dividing lines of the light receiving regions 82*b*–82*d* and 82*g*–82*i* coincides with the direction of the information track on the magneto-optical record medium 89. Then, the tracking error signal may be derived by the push-pull method by calculating the following equation:

$$TES = (Ib + Ii) - (Id + Ig) \tag{4}$$

Alternatively, the linear grating 84*c* formed in the hologram element 84 of the hologram laser unit 92 and the light receiving regions 82*a* and 82*j* are deleted and the hologram pattern 84*d* formed in the hologram element 84 is modified to have two regions 84*e* and 84*f* as illustrated in FIG. 23, the region 84*e* serving to diffract the return beam into ±1-order beams having image shifts in opposite directions which are received by the light receiving regions 82*b*–82*d* and 82*g*–82*i*, respectively and the region 84*f* being formed by a mere linear grating which diffracts the return beam into ±1-order beams which are received by the light receiving regions 82*e* and 82*f*, respectively.

Then, the focusing error signal FES may be obtained by using only the beams diffracted by the region 84*e* of the hologram element 84 in accordance with the beam size method as follows:

$$FES = (Ib + Id + Ih) - (Ic + Ig + Ii) \tag{5}$$

The tracking error signal TES may be derived by the push-pull method by deriving a difference in intensity between the beam diffracted by the region 84*e* and the beam diffracted by the region 84*f* in the following manner:

$$TES = (Ib + Ic + Id + Ig + Ih + Ii) - (Ie + If) \tag{6}$$

It should be noted that the servo signal detecting means for detecting the focusing error signal is not limited to the above mentioned hologram laser unit 92, but may be formed in various ways. For instance, it is possible to utilize a known servo signal detecting unit shown in FIG. 1 of Optical Memory Symposium, '86, Theses, page 94. This known servo signal detecting unit comprises a semiconductor laser (LD), a photodetector (PD) having four divided light receiving regions and a hologram having two regions and is small in size. In this case, the focusing error signal $S_{F.E}$ may be derived by the following equation described on page 94 of said theses:

$$S_{F.E} = (S1 + S4) - (S2 + S3) \tag{7}$$

Another known small size servo signal detecting unit illustrated in FIG. 1(*g*) of Optical Memory Symposium, '90, Theses, page 3 may be also utilized. This servo signal detecting unit includes a hologram element (HOE), a laser diode (LD) and a photodetector (PD) which are formed as a single integral body. In this case, the focusing error signal may be also detected by the Foucault method.

It should be further noted that a light module disclosed in FIGS. 2 and 3 of Optical Memory Symposium, '92, Theses, page 113 may be used as the servo signal detecting means. This light module comprises a hologram optical element (HOE), a laser diode (LD) and a photodetector (PD). In this case, the focusing error signal may be obtained by outputs of two light receiving regions D3 and D4 of the photodiode by the double knife-edge method.

Moreover, a known servo signal detecting means disclosed in Japanese Patent Application Publication Kokai Sho 63-160018 may be utilized. In this case, the focusing error can be detected in a manner disclosed in FIG. 5 of said publication.

In the above explained first to third embodiments, the laser beam reflected by the polarizing film is made incident upon the magneto-optical record medium perpendicularly, but according to the invention, a mirror may be arranged at a position opposite to the record medium with respect to the objective lens 88 to bend the laser beam by 90 degrees so that an optical axis situating opposite to the objective lens with respect to the mirror is in parallel with the record surface of the magneto-optical record medium. Then, a thickness of the optical pick-up apparatus may be thin. Further, in this construction, between the polarizing film and the mirror may be arranged a collimator lens to convert the diverging beam emitted by the semiconductor laser into a parallel beam which is then made incident upon the mirror.

In this case, it is possible to vary a distance between the mirror and the collimator lens at will, and therefore only the objective lens and mirror may be moved in a direction perpendicular to the direction of the information track on the magneto-optical record medium. Then, a high speed access may be realized as compared with a case in which whole the optical pick-up apparatus is moved in said direction. Furthermore, in the first to third embodiments, a collimator lens may be arranged between the polarizing film and the objective lens.

As explained above, in the first to third embodiments of the optical pick-up apparatus according to the invention, the return beam reflected by the magneto-optical record medium is made incident upon the polarizing film as the converging beam, and therefore the converging lens 26 in the known optical pick-up apparatus shown in FIG. 3 can be dispensed with and the whole apparatus can be small in size and cheap in cost. Moreover, at least the focusing error signal is detected by using the return beam reflected by the polarizing film, a strict adjustment of the position of the photodetector is no more required and this also contributes to a reduction of cost.

When the photodetector is arranged in a vicinity of a position at which the focal lines of the ordinary light and extraordinary light separated by the uniaxial birefringent crystal, the ordinary light and extraordinary light can be detected separately from each other in a positive manner, so that the information signal can be reproduced at a high precision.

Moreover, by suitably selecting the refractive index of the glass which is secured to the uniaxial birefringent crystal via the polarizing film, the aberrations can reduced, so that the two orthogonally polarized beams can be separated positively.

Figure 24:
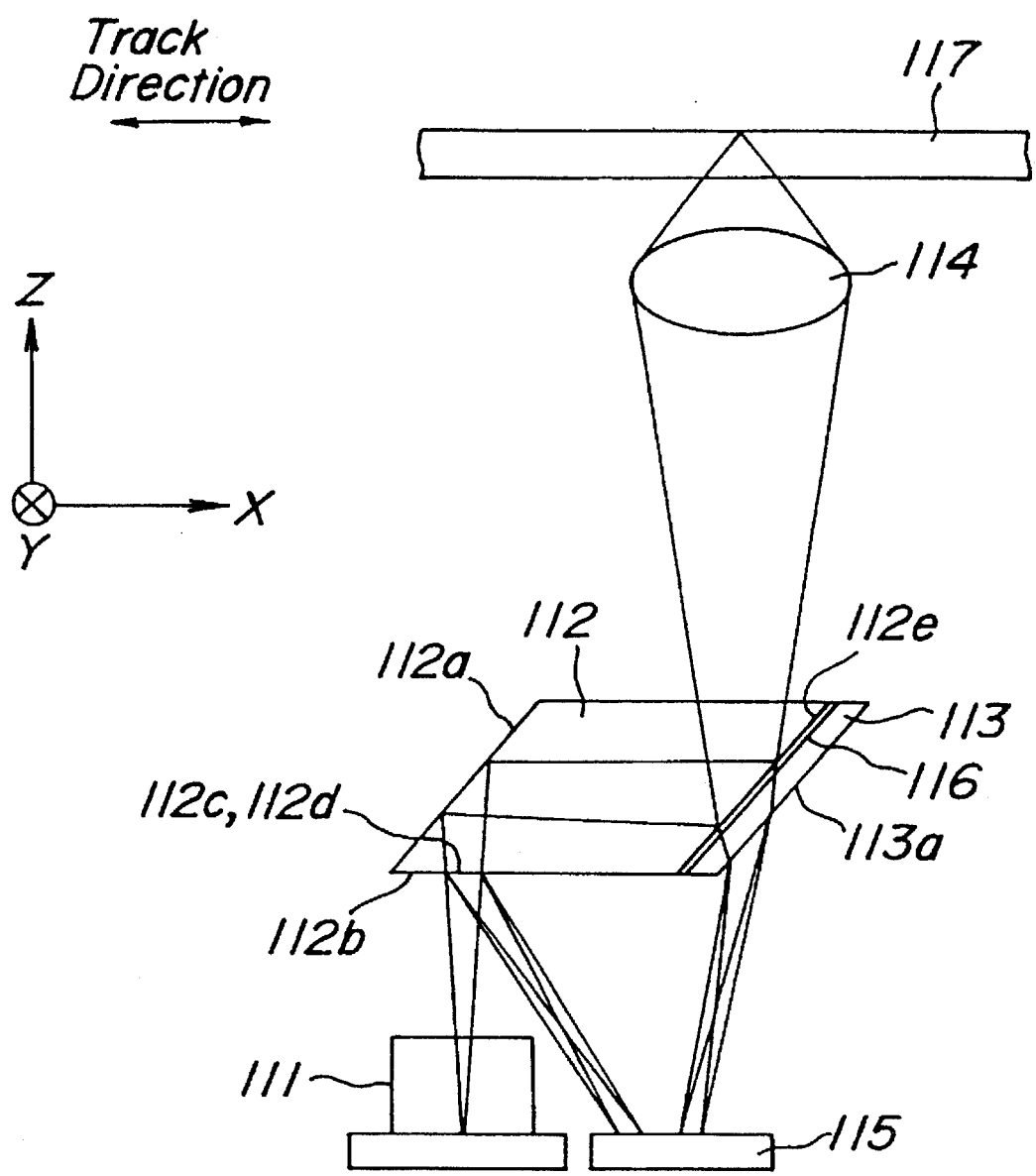
FIG. 24 is a schematic view illustrating a fourth embodiment of the present invention.

FIGS. 24 to 26 show a fourth embodiment of the optical pick-up apparatus according to the invention. The pick-up apparatus comprises semiconductor laser 111, parallel prism 112, uniaxial birefrigent crystal in the form of parallel plate 113, objective lens 114 and photodetector 115. On one of opposing surfaces 112a and 112e of the parallel prism 112 is applied a polarizing film 116, and the uniaxial birefringent crystal plate 113 is secured to the polarizing film. In a surface 112b opposing to the semiconductor laser 111 there are formed holograms 112c and 112d by, for instance etching. As depicted in FIG. 25, a pupil is divided by the holograms 112c and 112d along a line which extends in parallel with a direction of information track formed in a magneto-optical record medium 117.

The polarizing film 116 is formed to have a reflectance of 80% and a transmissivity of 20% for S polarized beam and have a reflectance of 0% and a transmissivity of 100% for P polarized beam. The uniaxial birefringent crystal 113 may be made of quartz, lithium niobate, calcite, KDP ($KH_2PO_4$), ADP ($NH_4H_2PO_4$), $MgF_2$, and is arranged such that its optic axis is directed to be inclined by 45 degrees with respect the plane of the drawing of FIG. 24.

As shown in FIG. 26, the photodetector 115 comprises a first light receiving section consisting of light receiving regions 118 and 119 and a second light receiving section consisting of light receiving regions 120 and 121. The light receiving region 121 is divided into two regions 121a and 121b along a dividing line parallel with the track direction X. These light receiving regions are formed on a surface of one and same semiconductor substrate.

The semiconductor laser 111 emits a laser beam linearly polarized in a direction Y which is perpendicular to the plane of FIG. 24. The laser beam is totally reflected by the reflecting surface 112a of the parallel prism 112 and is made incident upon the polarizing film 116 as S polarized light. 80% of the incident beam is reflected by the polarizing film 116 in a direction Z perpendicular to the magneto-optical record medium 117, and is made incident upon the record medium as a fine spot.

A return beam reflected by the magneto-optical record medium 117 is subjected to the Kerr rotation and its polarizing direction is slightly rotated. This return beam is made incident upon the polarizing film 116 substantially as S polarized beam by means of the objective lens 114 and parallel prism 112. About 20% of the return beam is then transmitted through the polarizing film 116 and remaining about 80% of the return beam is reflected by the polarizing film 116. It should be noted that since the polarizing film 116 completely transmits the P polarized component, the magneto-optical signal component is fully contained in the return beam transmitted through the polarizing film 116. The return beam transmitted through the polarizing film 116 is then made incident upon the uniaxial birefringent crystal plate 113 and is divided thereby into ordinary light and extraordinary light. These ordinary light and extraordinary light are refracted by an exit surface 113a of the uniaxial birefringent crystal plate 113, and are received by the light receiving regions 118 and 119 of the photodetector 115 separately from each other.

When the plate 113 is made of a positive uniaxial birefringent crystal having a lower refractive index for the ordinary light than a refractive index for the extraordinary light, a refraction angle of the ordinary light at the exit surface 113a is smaller than that of the extraordinary light. Therefore, the ordinary light is made incident upon the light receiving region 119 and the extraordinary light is received by the light receiving region 118. When the plate 113 is made of a negative uniaxial birefringent crystal, the ordinary light is made incident upon the light receiving region 118 and the extraordinary light is made incident upon the light receiving region 119.

As explained above, the uniaxial birefringent crystal plate 113 is arranged such that its optical axis is inclined by 45 degrees with respect to the plane of the drawing of FIG. 24, and thus the ordinary light polarized perpendicularly to the optic axis is made incident upon the light receiving region 118 and the extraordinary light polarized in parallel with the optic axis is made incident upon the light receiving region 119. Therefore, by deriving a difference between outputs of these light receiving regions 118 and 119, it is possible to obtain a reproduced RF information signal by the so-called differential detection.

About 80% of the return beam reflected by the polarizing film 116 is reflected by the reflection surface 112a of the parallel prism 112 and is made incident upon the holograms 112c and 112d. Return beams diffracted by the hologram 112c are received by the light receiving region 121 and a return beam diffracted by the hologram 112d is received by the light receiving region 120. The return beam diffracted by the hologram 112c has passed through a half of a pupil, and therefore it is possible to detect the focusing error by deriving a difference between outputs of the light receiving regions 121a and 121b by the knife-edge method. Moreover, the return beams impinging upon the light receiving regions 120 and 121 reflect a distribution of light intensity in the direction Y perpendicular to the track direction X, and thus by deriving a difference between outputs of the light receiving regions 120 and 121, the tracking error signal may be obtained by the push-pull method.

In the present embodiment, substantially all optical components are arranged substantially on the same plane, and therefore the apparatus can be assembled easily, and the incident light path and return light path can be substantially in the same direction, so that the apparatus is liable to be small in size.

In the present embodiment, the holograms 112c and 112d are formed in the surface of the parallel prism 112 which faces with the semiconductor laser 111, but these holograms may be formed in any desired surface of the prism. The focusing and tracking error signals are derived by separating the beam by means of the holograms 112c and 112d, but the focusing error signal may be obtained by constructing one of the light receiving regions 118 and 119 as a four-divided region and utilizing astigmatism introduced upon the refraction at the surface 113a of the uniaxial birefringent crystal plate 113. Moreover, the tracking error signal may be derived by the push-pull method by constructing one of the light receiving regions 118 and 119 to have two divided regions.

Further the uniaxial birefringent crystal plate 113 may be replaced by wedge or prism made of uniaxial birefringent crystal. Particularly, when use is made of the wedge-shaped crystal, positions of the ordinary and extraordinary light spots on the photodetector 115 may be adjusted by changing an apex angle of wedge, and thus the freedom of design is improved.

Figure 27:
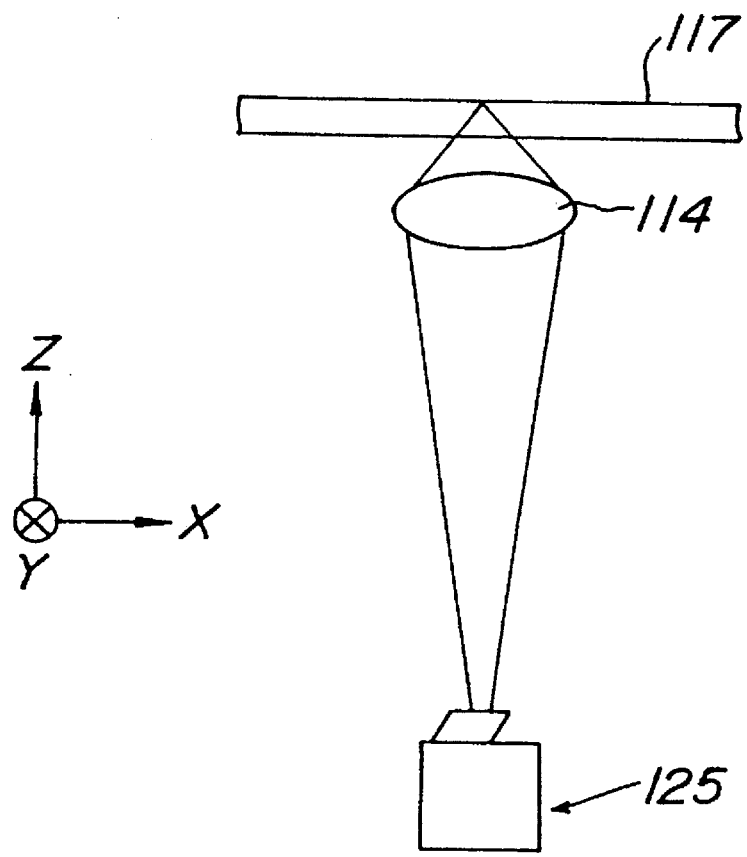
FIG. 27 is a schematic view of a fifth embodiment of the invention.
Figure 28:
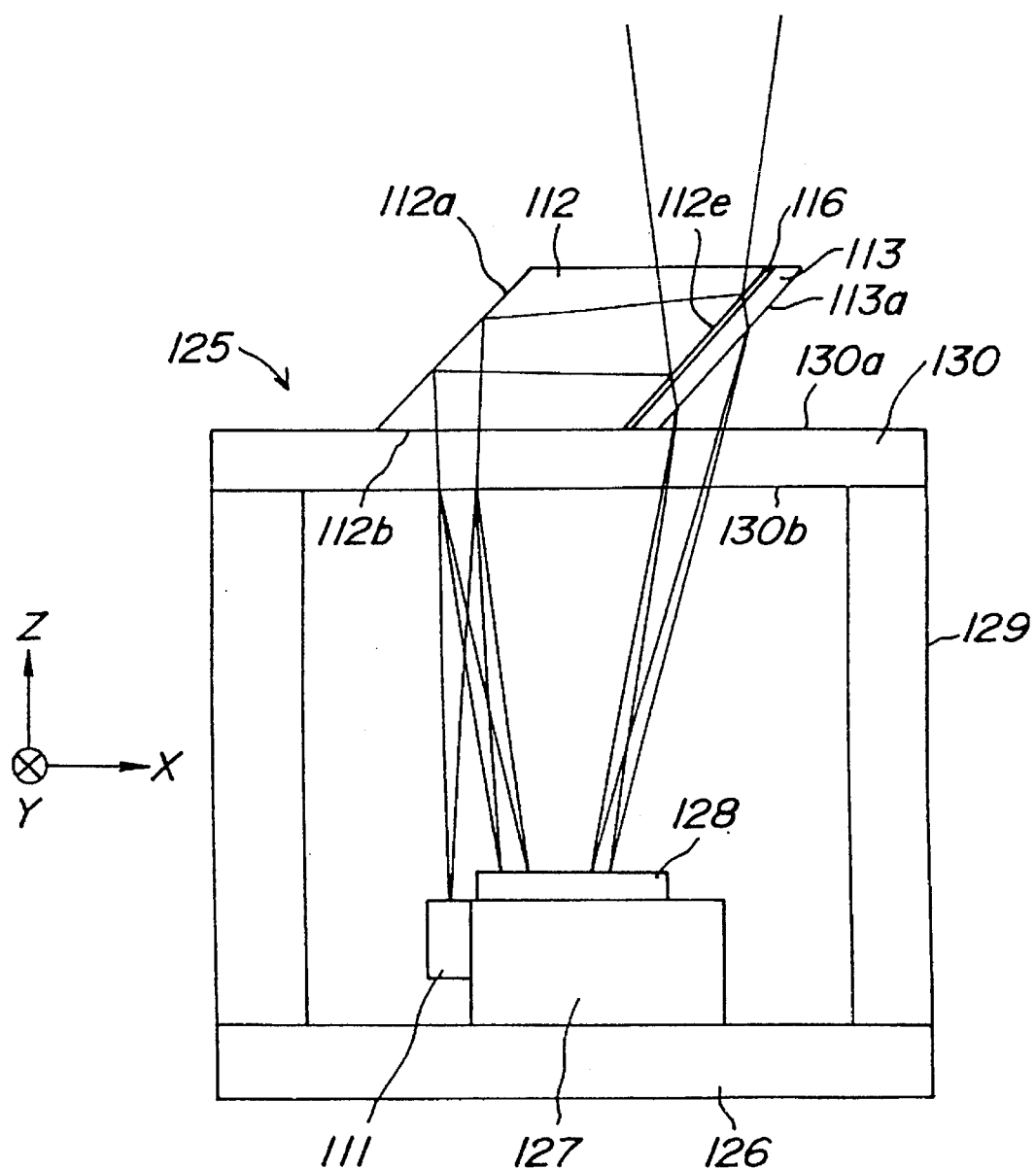
FIG. 28 is a schematic view showing a composite optical unit of the apparatus shown in FIG. 27.

FIGS. 27 and 28 are schematic views illustrating a fifth embodiment of the optical pick-up apparatus according to the invention. In the present embodiment, portions similar to those of the fourth embodiment shown in FIGS. 24 to 26 are denoted by the same reference numerals used in these figures. In the present embodiment, all optical components except for the objective lens 114 are formed as a single internal body called a composite optical unit 125. As illustrated in FIG. 28, the composite optical unit 125 comprises a base 126 and a sub-mount 127 provided on the base 126. The semiconductor laser chip 111 is provided on a side wall of the sub-mount 127. A semiconductor substrate 128 in which the light receiving regions 118, 119, 120 and 121 shown in FIG. 26 are formed is also provided on a top surface of the sub-mount 127. On the base 126 is provided a spacer 129 and a transparent plane parallel plate 130 is provided on the spacer 129. On an upper surface 130a of the plane parallel plate 130 is arranged an assembly of the parallel prism 112 to which the uniaxial birefringent crystal plate 113 is secured via the polarizing film 116. In the present embodiment, the holograms 112c and 112d shown in FIG. 25 are not formed in the surface 112b of the parallel prism 112, but are formed on a lower surface 130b of the glass plate 130. The reproduced information signal, focusing error signal and tracking error signal can be derived in the same manner as that of the fourth embodiment.

In the present embodiment, since the optical components other than the objective lens 114 are provided in the single unit 125, a size of the whole apparatus can be further reduced.

FIGS. 29 and 30 are schematic views showing a sixth embodiment of the optical pick-up apparatus according to the invention. In the present embodiment, all the optical components other than the objective lens 114 are provided in a single optical unit 131 in a similar manner to the fifth embodiment. As shown in FIG. 30, the parallel prism 112 having the uniaxial birefringent crystal prism 113 secured thereto via the polarizing film 116 is provided on the rear surface 130b of the plane parallel plate 130 and the holograms 112c and 112d are formed in the surface 112b of the parallel prism 112 similar to the fourth embodiment. Also in the present embodiment, the information signal, focusing error signal and tracking error signal can be derived in the same manner as the fifth embodiment.

In the present embodiment, since the parallel prism 112 is secured to the lower surface 130b of the plane parallel plate 130, the composite optical unit 131 may have a cubic or cylindrical contour configuration without any projection. Therefore, the assembling becomes further simple. Moreover, the parallel prism 112 is installed within the optical unit 131, so that it can be free from dust and humidity.

FIGS. 31 and 32 show a major portion of a seventh embodiment of the optical pick-up apparatus according to the invention. In the present embodiment, the semiconductor laser 111 and the photodetector including the light receiving regions 118, 119, 120 and 121 are formed on a single semiconductor substrate 135. As illustrated in a plan view of FIG. 31, the light receiving regions 118 to 121 are formed in a surface of the semiconductor substrate 135. In this surface of the semiconductor substrate 135 there is further formed by anisotropic etching a recess 136. As best shown in FIG. 32, on a bottom of the recess 136 is mounted the semiconductor laser chip 111 and an inclined side wall 136a is formed as a mirror which reflects the laser beam emitted by the semiconductor laser 111 upwardly.

Since the semiconductor laser 111 and light receiving regions 118 to 121 are formed on the semiconductor substrate 135 as an integral body, the number of parts and cost can be further reduced. It should be noted that in the fourth embodiment shown in FIG. 24, the semiconductor laser 111 and the photodetector 115 may be formed on a single common semiconductor substrate.

Figure 33:
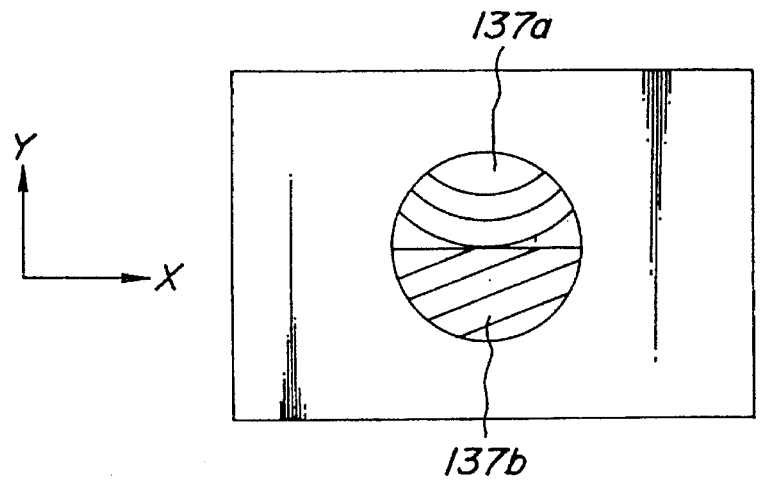
FIG. 33 is a plan view depicting a hologram of an eighth embodiment of the invention.
Figure 34:
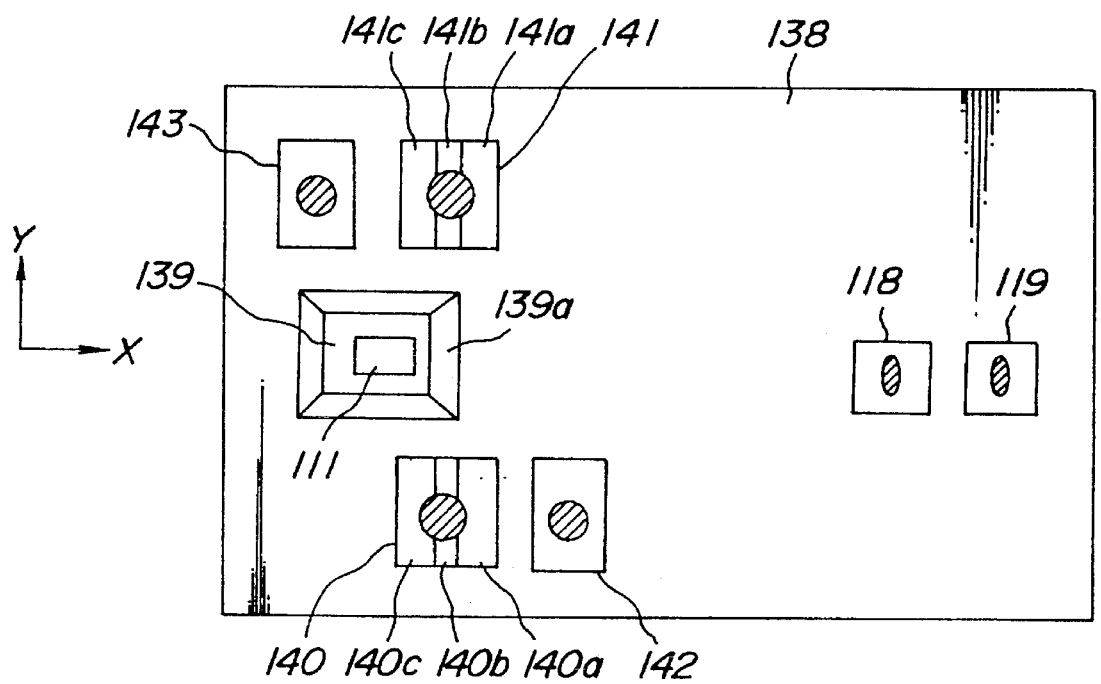
FIG. 34 is a plan view of a semiconductor substrate of the eighth embodiment.

FIGS. 33 and 34 depict a major portion of an eighth embodiment of the optical pick-up apparatus according to the invention. In the present embodiment, the hologram formed in the surface of the parallel prism 112 or the plane parallel plate 130 is formed to have a first hologram pattern 137a which gives negative and positive focal powers to ±1-order diffracted beams, respectively and a second hologram pattern 137b which has an equi-distant pitch pattern inclined with respect to the direction Y. The semiconductor laser 111 and light receiving regions of the photodetector are formed on a single semiconductor substrate 138 as illustrated in FIG. 34.

In FIG. 34, in a surface of the semiconductor substrate 138 there is formed a recess 139 and the semiconductor laser chip 111 is arranged on the bottom of the recess. The laser beam emitted by the semiconductor laser 111 is reflected upwardly by the side wall mirror 139a. In the surface of the semiconductor substrate 138, there are further formed the light receiving regions 118 and 119 consisting of the first light receiving section as well as four light receiving regions 140, 141, 142 and 143 consisting of the second light receiving section. The light receiving regions 140 and 141 are formed symmetrically with respect to a point at which a center light ray of the laser beam emitted by the semiconductor laser 111 is reflected by the side wall mirror 139a. Similarly the light receiving regions 142 and 143 are formed symmetrically with respect to the said point. The light receiving region 140 includes three regions 140a, 140b and 140c and the light receiving region 141 comprises three regions 141a, 141b and 141c, said regions being divided in the direction Y.

In the present embodiment, the return beam reflected by the magneto-optical record medium, transmitted through the polarizing film and separated by the uniaxial birefringent crystal into the ordinary light and extraordinary light are received by the light receiving regions 118 and 199 of the first light receiving section. Therefore, the reproduced RF signal may be obtained by deriving a difference between the output signals of these light receiving regions 118 and 119 similar to the previous embodiments.

The return beam reflected by the polarizing film is made incident upon the holograms 137a and 37b via the reflecting surface 112a of the parallel prism 112, and the ±1-order beams diffracted by the hologram 137a are received by the light receiving regions 140 and 141 and the ±1-order beams diffracted by the hologram 137b are received by the light receiving regions 142 and 143.

As explained above, the ±1-order beams diffracted by the hologram 137a have the opposite focal power, and thus ±1-order beam having the negative focal power is focused at a point behind the light receiving region 140 and the ±1-order beam having the positive focal power is focused at a point before the light receiving region 141. Now it is assumed that output signals from the light receiving regions 140a, 140b, 140c, 141a, 141b and 141c are Ia, Ib, Ic, Id, Ie, and If, then the focusing error signal FES by the beam size method in the following manner:

$$FES = (Ia + Ic + Ie) + (Ib + Id + If) \qquad (7)$$

The tracking error signal TES may be detected by the push-pull method by deriving a difference between a sum of outputs from the light receiving regions 140 and 141 and a sum of outputs from the light receiving regions 142 and 143.

In the present embodiment, the focusing error is detected in the far field, so that a size of the spots on the light receiving regions 140 and 141 can be large. Therefore, the positioning of the holograms 137a and 137b can be performed easily.

Figure 35:
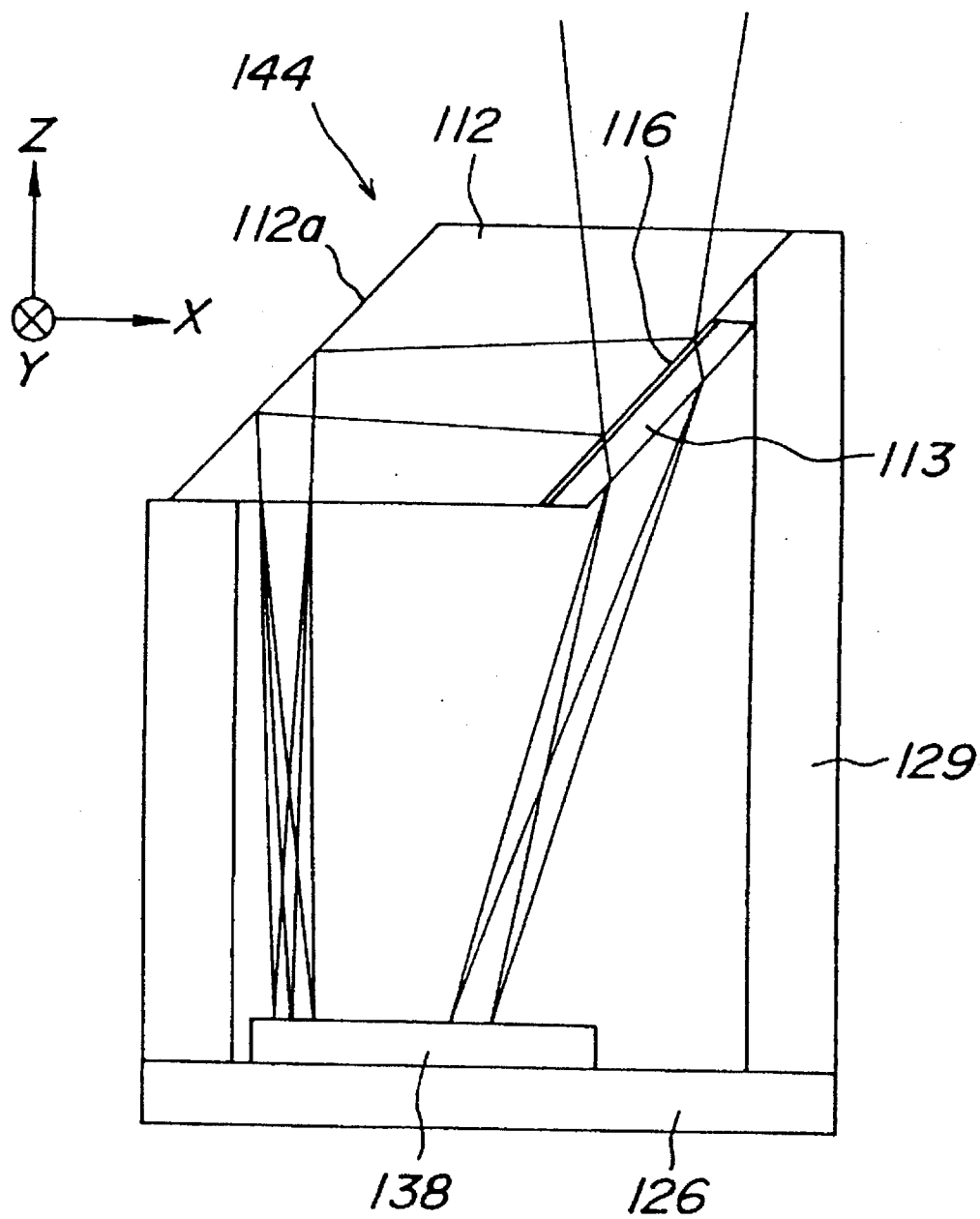
FIG. 35 is a schematic view illustrating a composite optical unit of a ninth embodiment of the invention.

FIG. 35 is a schematic view showing a ninth embodiment of the optical pick-up apparatus according to the invention. In the present embodiment, the semiconductor substrate 138 having the light receiving regions 118, 119, 140–143 and semiconductor laser 111 formed therein (FIG. 34) and the parallel prism 112 having the polarizing film 116, uniaxial birefringent crystal 113 and holograms 137a, 137b (FIG. 33) secured thereto are formed as a single composite optical unit 144. That is, on the base 126 is mounted the semiconductor substrate 138 and the parallel prism 112 is directly secured to the spacer 129 mounted on the base 126.

In this embodiment, the plane parallel plate 130 used in the fifth and sixth embodiments can be deleted, so that the number of parts and thus cost can be further reduced.

The above explained fourth to ninth embodiments can be also modified in various ways. For instance, a photodetector may be secured to the reflection surface 112a of the parallel prism 112 to receive light transmitted through the reflection surface. Then, the output power of the semiconductor laser 111 may be controlled or monitored. Moreover, in the fifth to ninth embodiments, use may be made of a wedge-shaped uniaxial birefringent crystal like the fourth embodiment.

In the fourth to ninth embodiments, the single laser beam is made incident upon the magneto-optical record medium, but the three beams, i.e. a single main beam and two sub-beams may be equally utilized. In this case, a grating for producing the three beams may be formed in the lower surface 103b of the plane parallel plate 130 shown in FIG. 28 and a hologram may be provided on the upper surface 130a of the plane parallel plate 130 or the lower surface 112b of the parallel prism 112 in order to detect the focusing error.

Figure 36:
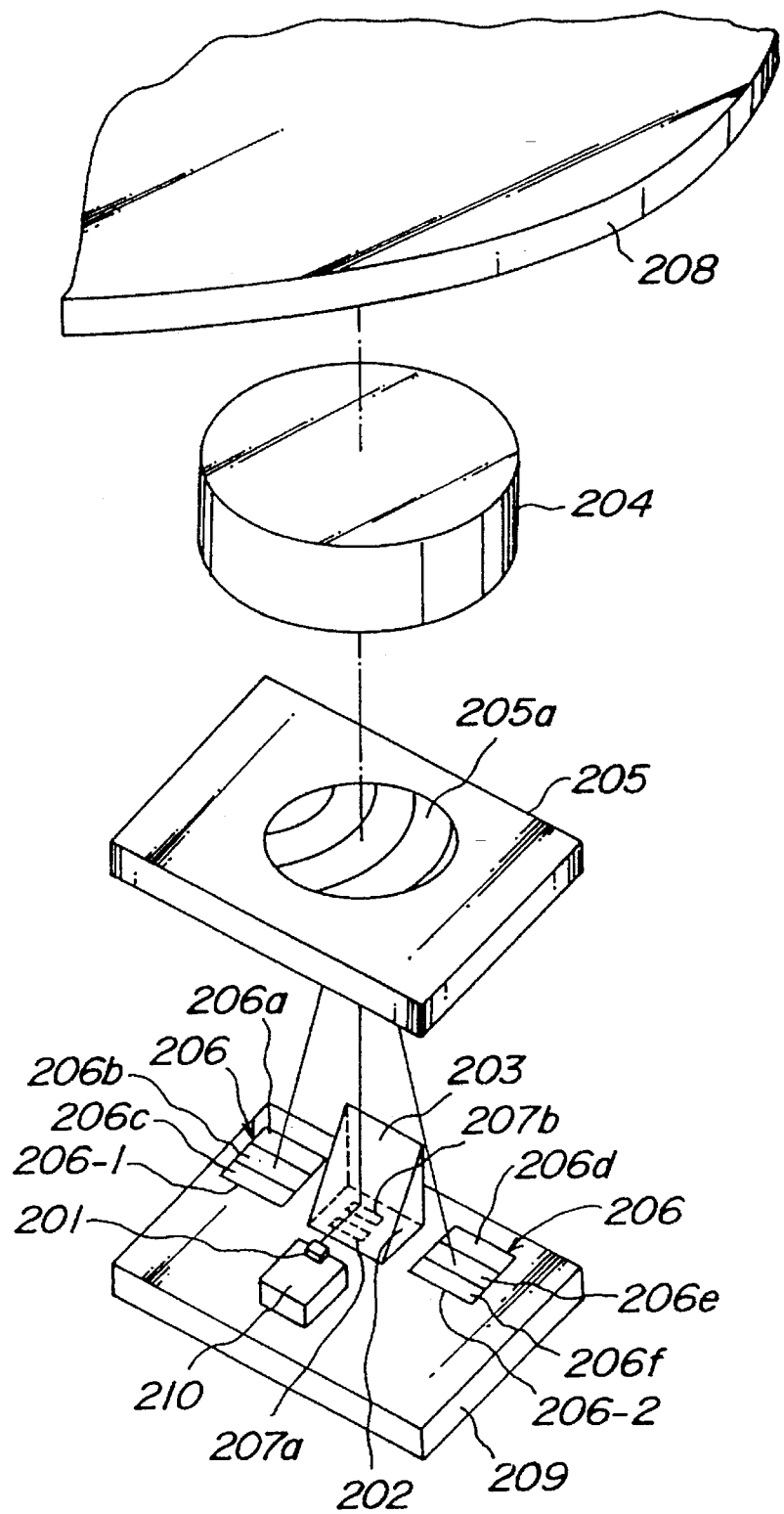
FIG. 36 is a perspective view showing a tenth embodiment of the invention.
Figure 37:
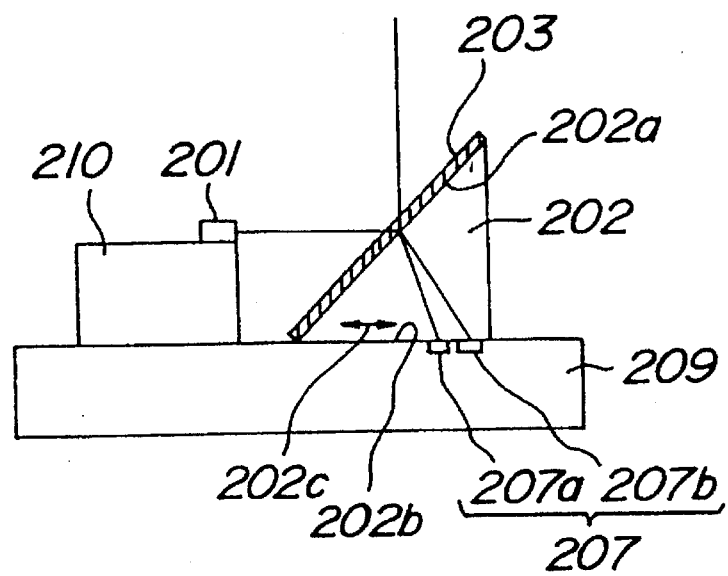
FIG. 37 is a schematic view of a major portion of the eighth embodiment.

FIGS. 36 and 37 are schematic views showing a tenth embodiment of the optical pick-up apparatus according to the invention. The apparatus comprises semiconductor laser 201, uniaxial birefringent crystal in the form of a lithium niobate prism 202, polarizing film 203 provided on an inclined surface 202a of the prism 202, objective lens 204, hologram 205, and first and second photodetectors 206 and 207. The semiconductor laser 201 is provided on a metal or semiconductor die 210 and the die is provided on a semiconductor substrate 209 on which the first and second photodetectors 206 and 207 are formed. The uniaxial birefringent crystal prism 202 is also secured on the surface of the semiconductor substrate 209. The polarizing film 203 is formed such that a reflectance for the S polarized beam is not less than 50% and a transmissivity for the P polarized beam is not less than 80%. A linearly polarized laser beam emitted by the semiconductor laser 201 in a horizontal direction is reflected by the polarizing film 203 substantially upwardly and is made incident upon the hologram 205.

The hologram 205 includes a hologram pattern 205a having a slight curvature. The laser beam transmitted through the hologram pattern 205a is made incident upon a magneto-optical record medium 208 by means of the objective lens 204 as a fine spot. A return beam reflected by the magneto-optical record medium 208 is made incident upon the hologram pattern 205a of the hologram 205 by means of the objective lens 204 and is diffracted thereby. 0-order diffracted beam emanating from the hologram pattern 205a is made incident upon the polarizing film 203, and ±1-order diffracted beams emanating from the hologram pattern are detected by the photodetector 206 separately from each other. A part of the 0-order beam impinging upon the polarizing film 203 is transmitted through the polarizing film and is made incident upon the uniaxial birefringent prism 202. This 0-order beam is refracted by the surface 202a of the prism 202 and is divided into P polarized light and S polarized light. Then, the P polarized light and S polarized light emanate from the second surface 202b of the prism 202 are received by the second photodetector 207 separately from each other. An optic axis 202c of the uniaxial birefringent crystal prism 202 is set on a plane perpendicular to the return beam and is inclined by 45 degrees with respect to the direction of the S polarized component.

The first photodetector 206 comprises two light receiving sections 206-1 and 206-2 receiving the ±1-order beams emanating from the hologram pattern 205a separately from each other. The first light receiving section 206-1 includes three light receiving regions 206a, 206b and 206c, and the second light receiving section 206-2 includes three light receiving regions 206d, 206e and 206f. These light receiving regions 206a to 206f are divided along lines which is parallel with the direction of the information track on the magneto-optical record medium 208. The second photodetector 207 is formed on the semiconductor substrate 209 such that it situates in a vicinity of focal lines of the ordinary light and extraordinary light due to the astigmatism by the refraction of the prism 202. The second photodetector 207 includes two light receiving regions 207a and 207b receiving the ordinary light and extraordinary light, respectively.

Now the operation of the optical pick-up apparatus of the present embodiment will be explained. The laser beam emitted by the semiconductor laser 201 is made incident upon the polarizing film 203 as the S polarized beam. Then more than 50% of the incident laser beam is reflected by the polarizing film 203 and is made incident upon the hologram pattern 205a of the hologram 205. More than 70% of the laser beam impinging upon the hologram pattern 205a is transmitted through this hologram pattern as 0-order beam, and this 0-order beam is made incident upon the magneto-optical record medium 208 as a laser beam spot by means of the objective lens 204.

The return laser beam reflected by the magneto-optical record medium 208 is converged by the objective lens 204 and is made incident upon the hologram pattern 205a of the hologram 205. More than 70% of the impinging return beam is transmitted through the hologram pattern 205a as 0-order beam and a part of the remaining return beam is diffracted as ±1-order beams. Due to the function of the hologram pattern 205a having a slight curvature, the ±1-order and −1-order beams are subjected to image shifts in opposite directions, and are made incident upon the light receiving regions 206a–206c of the first light receiving section 206-1 and the light receiving regions 206d–206f of the second light receiving section 206-2, respectively.

Then the focusing error signal can be derived by the beam size method in the following manner:

$$FES=(Ia+Ie+Ic)-(Id+Ib+If) \quad (9)$$

wherein Ia to If are output signals from the light receiving regions 206a to 206f, respectively. Further, the tracking error signal can be obtained by the push-pull method as follows:

$$TES=(Ia+If)-(Ic+Id) \quad (10)$$

The 0-order return beam transmitted through the hologram 205 is made incident again upon the polarizing film 203. As explained above, the polarizing direction of the return beam is subjected to the Kerr rotation in accordance with the information recorded on the magneto-optical record medium 208, so that the return beam impinging upon the polarizing film 203 contains a P polarized component. Less than 50% of the S polarized component of this return beam from the magneto-optical record medium 208 is refracted by the first surface 202a of the prism 202 and more than 80% of the P polarized component is refracted by the first surface 202a in different directions. In this manner, the incident return beam is divided into the ordinary light and extraordinary light due to the uniaxial birefringent crystal.

The ordinary light and extraordinary light emanating from the second surface 202b of the prism 202 are subjected to the astigmatism and coma due to the refraction at the first surface 202a of the prism 202. Due to the astigmatism, the ordinary light and extraordinary light are focused as lines and are received by the light receiving regions 207a and 207b of the second photodetector 207 arranged in a vicinity of the focal lines of the ordinary light and extraordinary light. Since the optic axis 202c of the uniaxial birefringent crystal prism 202 is on the plane perpendicular to the optical axis of the return beam from the magneto-optical record medium 208 and is inclined by 45 degrees with respect to the polarizing direction of the S polarized component, an angle of the polarizing direction of the return beam with respect to the optic axis 202c is changed, and thus intensities of the ordinary light and extraordinary light are also changed. Therefore, by detecting this intensity change by the light receiving regions 207a and 207b, it is possible to obtain the reproduced RF information signal corresponding to the information recorded on the magneto-optical record medium 208. It is assumed that output signals of these light receiving regions 207a and 207b are denoted by Ia and Ib, respectively, the reproduced magneto-optical signal S may be expressed as follows:

$$S=Ia+Ib \quad (11)$$

In the present embodiment, the magneto-optical signal S is derived by detecting the 0-order return beam transmitted through the hologram 205, more than 70% of the total return beam reflected by the magneto-optical record medium 208 can be utilized. In other words, loss in the signal detection becomes less than 30% of the total return beam. Furthermore, more than 80% of the P polarized component is transmitted through the polarizing film 203 and is refracted by the first surface 202a of the prism 202, and thus loss of the signal component due to the polarizing film 203 is smaller than 20% as compared with loss due to the half mirror in the known optical pick-up apparatus illustrated in FIG. 10. Further, since the second photodetector 207 is arranged in a vicinity of the focal lines of the ordinary light and extraordinary light, the ordinary light and extraordinary light emanating from the second surface 202b of the prism 202 can be detected separately from each other in a positive manner.

As explained above, in the present embodiment, it is possible to obtain the reproduced information signal having high C/N. In order to increase C/N of the reproduced magneto-optical signal, it is preferable to make the transmissivity of the hologram 205 for the 0-order beam more than 80% and to make the transmissivity of the polarizing film 203 for the P polarized component more than 90%, particularly more than 95%.

Figure 38:
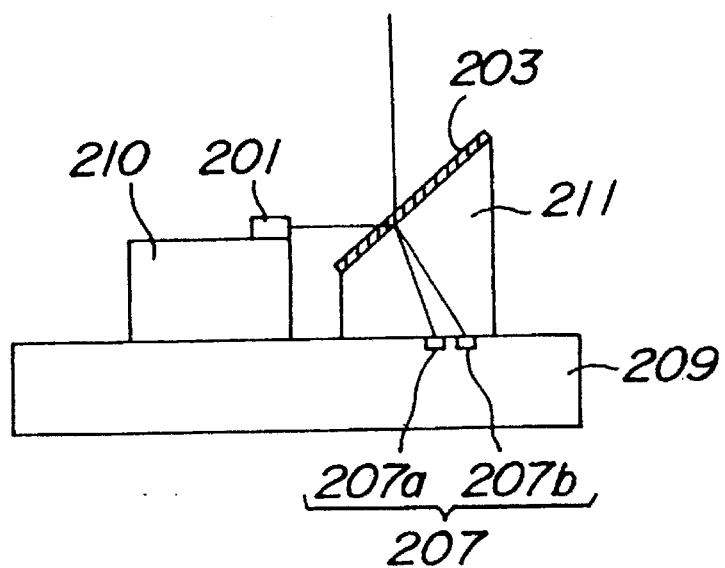
FIG. 38 is a schematic view showing a major portion of an eleventh embodiment of the invention.
Figure 39:
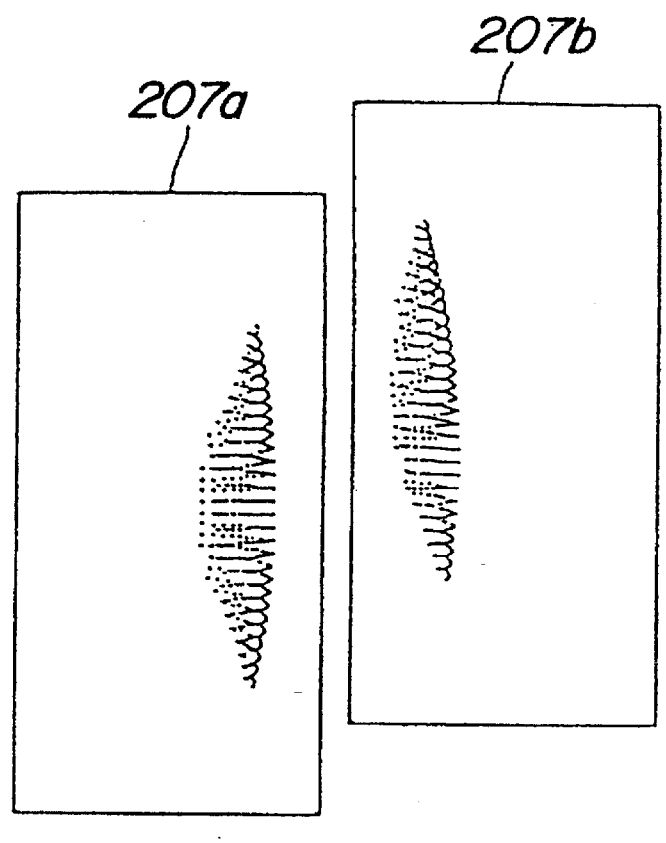
FIG. 39 is a plan view showing a photodetector shown in FIG. 38.

FIG. 38 shows a major portion of a eleventh embodiment of the optical pick-up apparatus according to the invention. In the present embodiment, portions similar to those shown in FIG. 37 are denoted by the same reference numerals used in FIG. 37. In the present embodiment, the uniaxial birefringent crystal prism 211 is constructed in the form of a trapezoidal prism instead of the triangular prism 202 shown in FIG. 37. The remaining construction of the present embodiment are entirely identical with that of the tenth embodiment illustrated in FIGS. 36 and 37. When use is made of the trapezoidal prism 211, the second photodetector 207 can be easily arranged in a vicinity of the focal lines of the ordinary light and extraordinary light, and thus these ordinary light and extraordinary light can be detected completely separately from each other as illustrated in a spot diagram of FIG. 39.

FIG. 40 is a schematic view showing a major portion of a twelfth embodiment of the optical pick-up apparatus according to the invention. In the present embodiment, between the uniaxial birefringent crystal prism 202 and the second photodetector 207 is arranged a transparent block 212. Also in this embodiment, the second photodetector 207 can be easily arranged in a vicinity of the focal lines of the ordinary light and extraordinary light like the eleventh embodiment.

FIG. 41 is a schematic view illustrating a major portion of a thirteenth embodiment of the optical pick-up apparatus according to the invention. In the present embodiment, between the uniaxial birefringent crystal prism 202 and the second photodetector 207 is arranged a spacer 213. Therefore, the second photodetector 207 can be easily arranged in a vicinity of the focal lines of the ordinary light and extraordinary light like the eleventh and twelfth embodiments.

In this embodiment, if the uniaxial birefringent crystal prism 202 is made of lithium niobate which has high refractive indices for the ordinary light and extraordinary light, there might be produced a total reflection at the second surface 202b of the prism 202. In order avoid such a drawback, the prism 202 is preferably made of an uniaxial birefringent crystal having lower refractive indices for the ordinary light and extraordinary light. Moreover, a space 214 within the spacer 213 is preferably filled with air or nitrogen.

FIG. 42 is a schematic view depicting a major portion of a fourteenth embodiment of the optical pick-up apparatus according to the invention. In the present embodiment, to the first surface 202a of the prism 202 is secured a glass prism 215 via the polarizing film 203. In this case, the light receiving regions 207a and 207b of the second photodetector 207 are not necessarily arranged in a vicinity of the focal lines of the ordinary light and extraordinary light, but may be arranged at an arbitrary position as long as the ordinary light and extraordinary light can be detected separately from each other.

In the present embodiment, the ±1-order beams diffracted by the hologram pattern 205a of the hologram 205 are made incident upon the first and second light receiving sections 206-1 and 206-2 consisting of the first photodetector 206, and the focusing error signal FES and tracking error signal TES can be derived from the outputs of the first and second light receiving sections 206-1 and 206-2 like the tenth embodiment shown in FIGS. 36 and 37. Further, the reproduced RF information signal S may be obtained by processing the output signals from the light receiving regions 207a and 207b of the second photodetector 207 like the tenth embodiment.

Moreover, since the glass prism 215 is cemented to the first surface 202a of the uniaxial birefringent crystal prism 202 via the polarizing film 203, it is possible to suppress the astigmatism and coma introduced by the refraction at the first surface 202a of the prism 202. Therefore, the ordinary light and extraordinary light emanating from the second surface 202b of the prism 202 can be detected separately from each other without arranging the light receiving regions 207a and 207b of the second photodetector 207 in a vicinity of the focal lines of the ordinary light and extraordinary light, and thus a freedom of design is enhance.

Also in the present embodiment, the magneto-optical signal can be obtained at high C/N. As explained above, in order to increase C/N, it is preferable to make the transmissivity of the hologram 205 for the 0-order beam more than 80% and make the transmissivity of the polarizing film 203 for the P polarized beam more than 90%, particularly more than 95%.

It should be noted that the fourteenth embodiment shown in FIG. 42 may be modified in various ways illustrated in FIGS. 38 to 41. For instance, the triangular prism 202 may be replaced by the trapezoidal prism shown in FIG. 38, the transparent block 212 shown in FIG. 40 may be arranged between the prism 202 and the second photodetector 207, or the spacer 213 illustrated in FIG. 41 may be provided between the prism 202 and the second photodetector 207. When the spacer 213 is provided, a refraction angle at the first surface 202a of the prism 202 is small and the total reflection does not occur at the second surface 202b of the prism 202, and therefore the prism 202 may be made of an uniaxial birefringent crystal having a high refractive index.

In the fourteenth embodiment depicted in FIG. 42, when the uniaxial birefringent crystal prism 202 is made of a material having refractive indices for the ordinary light and extraordinary light which are comparative to a refractive index of about 1.8 of a normally used glass, the astigmatism and coma can be further reduced by making the glass prism 215 of a material having a refractive index which is between a refractive index of the prism 202 for the ordinary light and that for the extraordinary light. Contrary to this, when the prism 202 is made of lithium niobate or rutile having the refractive indices for the ordinary light and extraordinary light higher than a refractive index of the high refractive index glass (at most about 1.8), the glass prism 215 is preferably made of a high refractive index glass having a refractive index not lower than 1.6 in a view of suppression of aberrations.

In the fourteenth embodiment shown in FIG. 42, the second photodetector 207 may be arranged in a vicinity of the focal lines of the ordinary light and extraordinary light. In this case, the ordinary light and extraordinary light can be detected separately from each other in a much more positive manner, although the astigmatism and coma introduced by the refraction of the ordinary light and extraordinary light could not be suppressed sufficiently.

In the embodiments shown in FIGS. 36 to 42, the ±1-order beams diffracted by the hologram pattern 205a of the hologram 205 are received by the first and second light receiving sections 206-1 and 206-2 separately from each other, and the focusing error signal FES and tracking error signal TES are derived by processing the outputs of the light receiving regions 206a to 206f. The focusing error signal FES and tracking error signal TES may be derived in different manners.

FIGS. 43 and 44 are plan views showing a major portion of a fifteenth embodiment of the optical pick-up apparatus according to the invention. In this embodiment, a light receiving region 206g is added to the first light receiving section 206-1 and a light receiving region 206f is added to the second light receiving section 206-2. The three light receiving regions 206a to 206c of the first light receiving section 206-1 and the three light receiving regions 206d to 206f of the second light receiving section 206-2 are divided along lines which are perpendicular to the direction of the information track on the magneto-optical record medium. The hologram pattern 205a of the hologram 205 is consisting of first and second hologram pattern regions 205b and 205c as illustrated in FIG. 44. These hologram pattern regions 205b and 205c are preferably divided along a line which is parallel with the track direction. The first hologram pattern region 205b is formed linearly and the second hologram pattern region 205c is formed to have a slight curvature.

The ±1-order beams diffracted by the second hologram pattern region 205c of the hologram pattern 205a are given the opposite focal powers and are received by the light receiving regions 206a to 206c of the first light receiving section 206-1 and the light receiving regions 206d to 206f of the second light receiving section 206-2 separately from each other. The ±1-order beams diffracted by the first hologram pattern region 205b of the hologram pattern 205a are received by the light receiving regions 206g and 206h, respectively. Then, the focusing error signal FES can be derived by the beam size method in the following manner:

$$FES=(Ia+Ie+Ic)-(Id+Ib+If) \qquad (12)$$

and the tracking error signal TES can be obtained by the push-pull method as follows:

$$TES=(Ia+Ib+Ic+Id+Ie+If)-(Ig+Ih) \qquad (13)$$

wherein Ia to Ih are output signals from the light receiving regions 206a to 206h.

Figure 45:
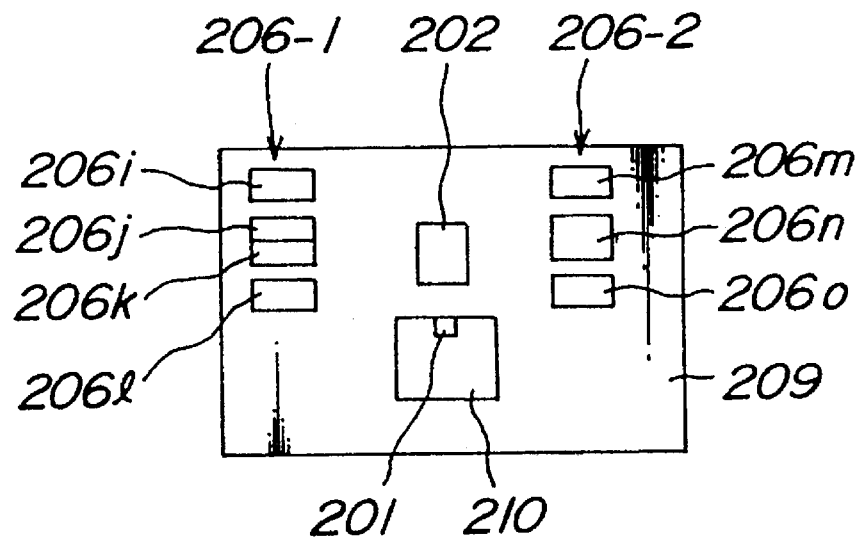
FIG. 45 is a plan view showing a semiconductor substrate of a sixteenth embodiment of the invention.
Figure 46:
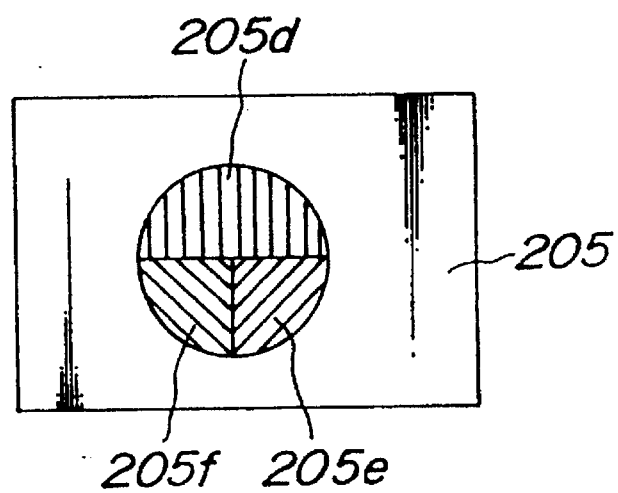
FIG. 46 is a plan view of a hologram of the sixteenth embodiment.

FIGS. 45 and 46 show a major portion of a sixth embodiment of the optical pick-up apparatus according to the invention. In the present embodiment, the first light receiving section 206-1 of the first photodetector 206 comprises light receiving regions 206i to 206l and the second light receiving section 206-2 includes light receiving regions 206m to 206o. The light receiving regions 206j and 206k are divided along a line which is perpendicular to the track direction. The hologram 205 comprises three hologram pattern regions 205d, 205e and 205f as depicted in FIG. 46. A dividing line along which the region 205d and the regions 205e, 205f are divided is preferably set to be perpendicular to the track direction and a dividing line along which the regions 205e and 205f are divided is preferably set to be parallel with the track direction. Each of the hologram pattern regions 205d, 205e and 205f has a linear configuration.

The +1-order beam diffracted by the first hologram pattern region 205d of the hologram pattern 205a is made incident upon the dividing lines between the light receiving regions 206j and 206k of the first light receiving section 206-1 and the −1−order beam diffracted by the first hologram pattern region 205d is made incident upon the light receiving region 206n of the second light receiving section 206-2 separately from each other. The ±1-order beams diffracted by the second hologram pattern region 205e of the hologram 205 are received by the light receiving regions 206i and 206o, respectively. The ±1-order beams diffracted by the third hologram pattern region 205f of the hologram 205 are received by the light receiving regions 206l and 206m, respectively. It is assumed that the output signals from the light receiving regions 206i to 206o are denoted by Ii to Io. Then, the focusing error signal FES can be derived by the beam size method as follows:

$$FES=Ij-Ik \quad (14)$$

and the tracking error signal TES can be obtained by the push-pull method as follows:

$$TES=(Ii+Io)-(Il+Im) \quad (15)$$

In a modification of the sixteenth embodiment shown in FIGS. 45 and 46, the light receiving regions 206m to 206o are deleted. Then, the focusing error signal FES may be derived by the knife-edge method and the tracking error signal TES may be derived by the push-pull method in the following manner:

$$FES=Ij-Ik \quad (16)$$

$$TES=Ii-Il \quad (17)$$

In the embodiments shown in FIGS. 36 to 46, the first photodetector 206 and second photodetector 207 are formed on the same semiconductor substrate 209, but according to the invention they may be formed on separate semiconductor substrates.

Figure 47:
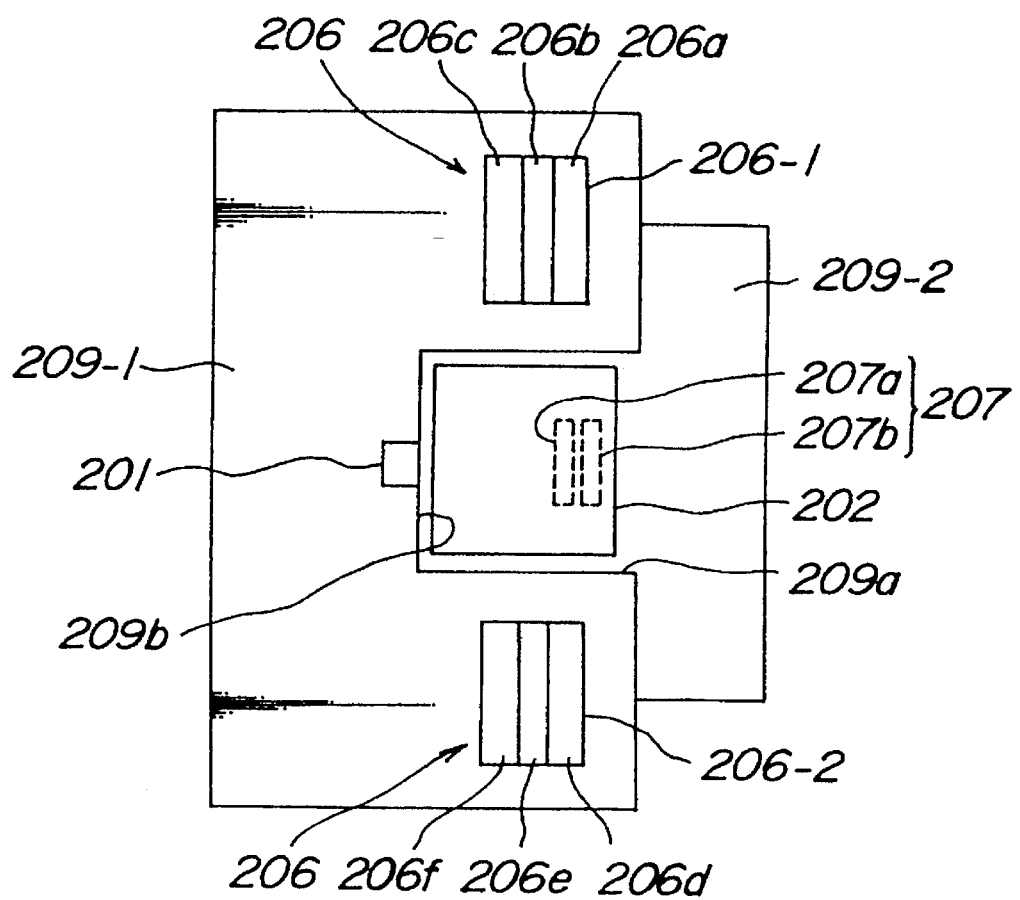
FIG. 47 is a plan view showing a semiconductor substrate of a seventeenth embodiment of the invention.

FIGS. 47 and 48 are plan and schematic views showing a seventeenth embodiment of the optical pick-up apparatus according to the invention, in which the first and second photodetectors are formed on different semiconductor substrates. The basic construction of this embodiment is identical with the tenth embodiment shown in FIGS. 36 and 37. The first and second light receiving sections 206-1 and 206-2 of the first photodetector are formed on a first semiconductor substrate 209-1 and the light receiving regions 207a and 207b of the second photodetector 207 are formed on a second semiconductor substrate 209-2. In the first semiconductor substrate 209-1 there is formed a recess 209a by etching, and the first and second semiconductor substrates 209-1 and 209-2 are cemented with each other such that the second photodetector 207 is positioned in the recess 209a. The semiconductor laser 201 is arranged on the first semiconductor substrate 209-1 such that its end surface is coincided with a middle side face 209b of the recess 209a. The uniaxial birefringent crystal prism 202 is secured to the second semiconductor substrate 209-2 such that it situates at a middle between the first and second light receiving sections 206-1 and 206-2 formed on the first semiconductor substrate 209-1. In this manner, the first and second photodetectors 206 and 207 are formed on the different semiconductor substrates 209-1 and 209-2, and thus a distance between the hologram 205 and the first photodetector 206 and a distance between the hologram 205 and the second photodetector 207 can be adjusted at will and a freedom of design is further improved.

FIG. 49 is a schematic view illustrating an eighteenth embodiment of the optical pick-up apparatus according to the invention. In the present embodiment, the semiconductor laser 201 is provided on the die 210 and the die is arranged on the first semiconductor substrate 209-1 which is provided on the second semiconductor substrate 209-2. In this construction, the a distance between the semiconductor laser 201 and the hologram 205 can be adjusted at will, and thus a freedom of design is furthermore enhanced.

In modifications of the embodiments so far explained with reference to FIGS. 36 to 49, a third photodetector may be provided to receive the laser beam emitted by the semiconductor laser and an output power of the semiconductor laser may be controlled by suitably processing an output signal of the third photodetector.

Figure 50:
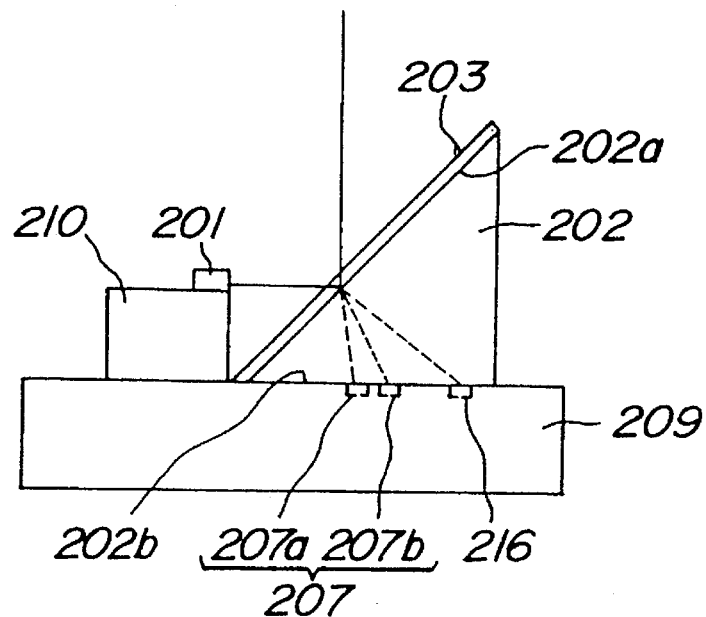
FIG. 50 is a schematic view of a semiconductor substrate of a nineteenth embodiment of the invention.

FIG. 50 is a schematic view showing a major portion of a nineteenth embodiment of the optical pick-up apparatus according to the invention. In the present embodiment, the laser beam emitted by the semiconductor laser 201 is made incident upon the polarizing film 203 and a part of the incident laser beam is transmitted through the polarizing film. This laser beam is refracted by the first surface 202a of the uniaxial birefringent crystal prism 202 and exits from the second surface 202b of the prism. The laser beam emanating from the second surface 202b of the prism 202 is received by a third photodetector 216 formed in the surface of the semiconductor substrate 209. It should be noted that the laser beam transmitting through the prism is divided into ordinary light and extraordinary light, but in FIG. 50 they are shown by a single light ray for the sake of simplicity. An output of the third photodetector 216 is processed by a power control circuit like the first embodiment shown in FIG. 13 to control the output power of the laser beam emitted by the semiconductor laser 201.

Figure 51:
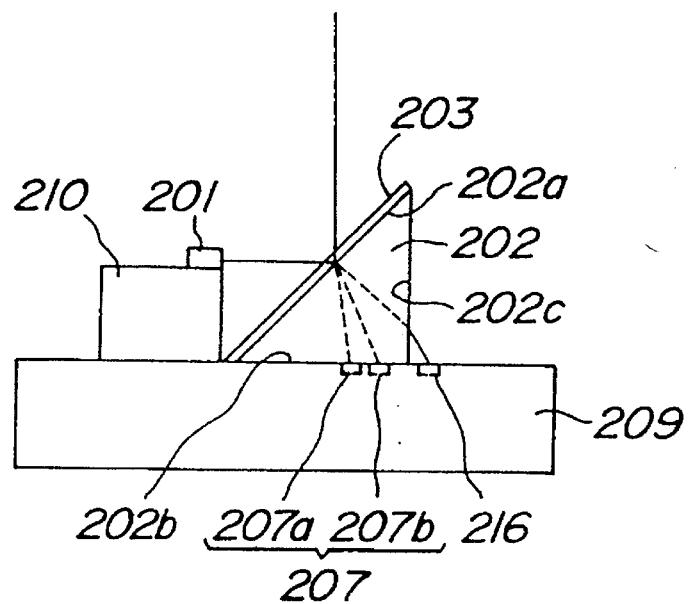
FIG. 51 is a schematic view of a major portion of a twentieth embodiment of the invention.

FIG. 51 is a schematic view illustrating a twentieth embodiment of the optical pick-up apparatus according to the invention. In the present embodiment, a part of the laser beam emitted by the semiconductor laser 201, transmitted through the polarizing film 203, and emanating from a third surface 202c of the uniaxial birefringent crystal prism 202 is received by the third photodetector 216 formed on the semiconductor substrate 209. Also in this embodiment, the output power of the laser beam emitted by the semiconductor laser 201 can be adjusted by suitably processing the output signal from the third photodetector 216. Therefore, it is possible to obtain the laser beam having a desired power in a stable manner, so that the reproduction of the information signal can be performed accurately. It should be noted that it is not necessary to form the third photodetector in a single semiconductor substrate together with the first and second photodetectors are formed.

In the embodiments shown in FIGS. 36 to 51, the laser beam emitted by the semiconductor laser 201 is reflected by polarizing film 203 provided on the first surface 202a in such a direction that the reflected laser beam is made incident upon the magneto-optical record medium per perpendicularly thereto. According to the invention, it is also possible to arrange a mirror between the objective lens 204 and the hologram 205 such that the laser beam reflected by the polarizing film is reflected by the mirror by 90 degrees.

Then, a thickness of the optical pick-up apparatus may be reduced.

Furthermore, in the above explained modifications of the embodiments shown in FIGS. 36 to 51, between the polarizing film and the mirror there may be further arranged a collimator lens to convert the diverging beam emitted by the semiconductor laser into a parallel beam which is then made incident upon the mirror. In this case, it is possible to vary a distance between the mirror and the collimator lens at will, so that only the objective lens and mirror can be moved in a direction perpendicular to the direction of the information track on the magneto-optical record medium. Then, a high speed access to a desired track on the record medium can be realized as compared with a case in which whole the optical pick-up apparatus is moved in said direction.

As explained above, in the embodiments illustrated in FIGS. 36 to 51, the reproduced RF information signal is derived by detecting the return light beam which is transmitted through the hologram as the O-order beam and is transmitted through the polarizing film, and thus loss of a signal component can be minimized and the information having high C/N can be obtained. Moreover, the second photodetector is arranged in a vicinity of the focal lines of the ordinary light and extraordinary light divided by the uniaxial birefringent crystal prism, the ordinary light and extraordinary light can be detected separately form each other in a positive manner.

Furthermore, in the fourteenth embodiment shown in FIG. 42, the glass prism 215 is provided on the first surface 202a of the prism 202, the aberrations introduced by the refraction at the first surface 202a of the prism 202 can be suppressed, and therefore the ordinary light and extraordinary light can be separated from each other in much more positive manner.

What is claimed is:

1. An optical pick-up apparatus comprising:

a light source means for emitting a light beam;

an optical means including a uniaxial birefringent crystal member having a surface and a polarizing film provided on said surface of the uniaxial birefringent crystal member, said polarizing film being arranged such that said light beam emitted by said light source means is made incident upon the polarizing film;

a converging means for converging the light beam emitted by said light source means and reflected said polarizing film of the optical means to obtain a converged light beam, directing the converged light beam onto a magneto-optical information record medium and directing a return light beam reflected by said magneto-optical information record medium toward said polarizing film, said polarizing film transmitting a first portion of said return beam into said uniaxial birefringent crystal member;

a hologram means for dividing a second portion of said return beam reflected by the magneto-optical information record medium into at least two light beams;

a first photodetecting means for receiving two mutually orthogonally polarized return light beams transmitted through said polarizing film and refracted by said uniaxial birefringent crystal member to produce first output signals, an information signal being reproduced by processing said first output signals; and a second photodetecting means for receiving said at least two light beams emanating from said hologram means to produce second output signals, a positional error signal including at least a focusing error signal being obtained by processing said second output signals.

2. An apparatus according to claim 1, wherein said optical means further comprises a glass member which is applied on said polarizing film provided on said surface of the uniaxial birefringent crystal member.

3. An apparatus according to claim 1, wherein said first photodetecting means is arranged in a vicinity of a plane on which focal lines of the two mutually orthogonally polarized return light beams due to astigmatism introduced by refraction by said uniaxial birefringent member are formed.

4. An apparatus according to claim 1, wherein said hologram means is arranged between said light source means and said optical means such that the light beam emitted by said light source means is transmitted through said hologram means as a 0-order beam and is made incident upon said polarizing film, and a return light beam reflected by said polarizing film is diffracted by said hologram means as ±1-order beams.

5. An apparatus according to claim 4, wherein said light source means comprises a semiconductor substrate and a semiconductor laser which is provided on said semiconductor substrate, and said second photodetecting means is formed in said semiconductor substrate.

6. An apparatus according to claim 1, wherein said hologram means is arranged between said optical means and said converging means such that the light beam emitted by said light source means is reflected by said polarizing film and is transmitted through said hologram means as a first 0-order beam and is made incident upon said magneto-optical record medium by means of said converging means, the return light beam reflected by said magneto-optical record medium is made incident upon said hologram means by said converging means, said first portion comprises a second 0-order beam which is transmitted through said hologram and made incident upon said polarizing film, and said second portion comprises ±1-order beams which are diffracted by said hologram means and made incident upon said second photodetecting means.

7. An apparatus according to claim 6, wherein said light source means comprises a semiconductor substrate and a semiconductor laser which is provided on said semiconductor substrate, and said first and second photodetecting means are formed in said semiconductor substrate.

8. An apparatus according to claim 7, wherein said uniaxial birefringent crystal member is formed as a uniaxial birefringent crystal prism and is provided on said semiconductor substrate.

9. An apparatus according to claim 1, further comprising a third photodetecting means for receiving a portion of said light beam emitted by said light source means which is transmitted through said polarizing film and uniaxial birefringent crystal member to obtain a third output signal, and a controlling means for controlling an output power of said light beam emitted by said light source means in accordance with the third output signal.

10. An apparatus according to claim 1, wherein said optical means further comprises a prism having reflecting surfaces opposed to each other and an incident surface upon which the light beam emitted by said light source means is made incident, said uniaxial birefringent crystal member is provided on one of said opposed reflecting surfaces of the prism via said polarizing film, and said hologram means is provided on said incident surface of the prism.

11. An apparatus according to claim 10, further comprising a semiconductor substrate wherein said first and second photodetecting means are formed in a surface of said semiconductor substrate.

12. An apparatus according to claim 11, wherein said light source means comprises a semiconductor laser, and said semiconductor laser and semiconductor substrate are arranged on a single die.

13. An apparatus according to claim 1, wherein said first photodetecting means comprises first and second light receiving regions which receive said two mutually orthogonally polarized return beams, respectively, and produce said first output signals, and wherein said information signal is obtained by deriving a difference between said first output signals.

14. An apparatus according to claim 13, wherein said second photodetecting means comprises a plurality of light receiving regions receiving at least two return beams diffracted by said hologram means, to produced said second output signals, and the apparatus further comprises a servo controlling means for deriving said focusing error signal and a tracking error signal by processing said second output signals.

15. An apparatus according to claim 1, wherein said uniaxial biregfringent crystal member is a uniaxial birefringent crystal prism.

16. An apparatus according to claim 1, wherein said light source means is a hologram laser unit.

17. An apparatus according to claim 16, wherein said hologram laser unit includes said hologram means.

18. An apparatus according to claim 1, wherein said hologram means is disposed in a path of the light beam emitted by the light source means.

* * * * *